(12) United States Patent
Woo et al.

(10) Patent No.: US 10,216,398 B2
(45) Date of Patent: Feb. 26, 2019

(54) DISPLAY APPARATUS AND METHOD FOR DISPLAYING

(71) Applicant: Samsung Electronics Co., Ltd., Suwon-si, Gyeonggi-do (KR)

(72) Inventors: Soog-yeong Woo, Seoul (KR); Eun-bi Kim, Seoul (KR); Su-hyun Na, Seoul (KR); Jong-kee Lee, Seoul (KR); Hee-young Chung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/093,119

(22) Filed: Apr. 7, 2016

(65) Prior Publication Data

US 2016/0306534 A1 Oct. 20, 2016

(30) Foreign Application Priority Data

Apr. 16, 2015 (KR) ........................ 10-2015-0053875

(51) Int. Cl.
*G06F 3/0484* (2013.01)
*G09G 5/38* (2006.01)
*G09G 5/373* (2006.01)

(52) U.S. Cl.
CPC ......... *G06F 3/04847* (2013.01); *G09G 5/373* (2013.01); *G06F 2203/04102* (2013.01); *G09G 5/38* (2013.01); *G09G 2320/08* (2013.01); *G09G 2340/04* (2013.01); *G09G 2340/0407* (2013.01); *G09G 2340/0442* (2013.01); *G09G 2340/0464* (2013.01); *G09G 2380/02* (2013.01)

(58) Field of Classification Search
CPC ................................. G09G 2380/02

USPC ........................................................ 345/661
See application file for complete search history.

(56) References Cited

U.S. PATENT DOCUMENTS

| | | | | |
|---|---|---|---|---|
| 5,737,123 A * | 4/1998 | Donohoe | ................ | H04N 5/64 348/836 |
| 6,507,435 B1 * | 1/2003 | Bergman | ............... | G03B 21/58 359/443 |
| 8,144,174 B2 * | 3/2012 | Shiomi | ................ | G06T 3/40 345/629 |
| 8,169,698 B1 * | 5/2012 | Robinson | ............... | G03B 21/56 359/449 |
| 8,543,166 B2 * | 9/2013 | Choi | ................ | G06F 1/1601 345/156 |

(Continued)

FOREIGN PATENT DOCUMENTS

| | | |
|---|---|---|
| EP | 1 970 886 A1 | 9/2008 |
| JP | 2005-39794 A | 2/2005 |

(Continued)

OTHER PUBLICATIONS

European Search Report dated Jan. 17, 2018, issued in the European Patent Application No. 16780226.3.

*Primary Examiner* — Javid A Amini
(74) *Attorney, Agent, or Firm* — Jefferson IP Law, LLP

(57) ABSTRACT

A display apparatus is provided. The display apparatus includes a flexible display configured to display an image, a driver configured to change a screen size of the flexible display, and a processor configured to control the driver to display an image corresponding to a content, at a screen size corresponding to a size of a content to be displayed in the flexible display.

20 Claims, 46 Drawing Sheets

(56) References Cited

U.S. PATENT DOCUMENTS

| | | | | |
|---|---|---|---|---|
| 2005/0176470 A1* | 8/2005 | Yamakawa | G09G 3/001 | 455/566 |
| 2007/0180745 A1* | 8/2007 | Ofuji | G03B 21/58 | 40/601 |
| 2010/0060548 A1* | 3/2010 | Choi | G06F 3/0414 | 345/1.3 |
| 2013/0265221 A1* | 10/2013 | Lee | G06F 3/01 | 345/156 |
| 2014/0028596 A1* | 1/2014 | Seo | G06F 3/0487 | 345/173 |
| 2014/0111417 A1* | 4/2014 | Son | G06F 3/14 | 345/156 |
| 2014/0118317 A1* | 5/2014 | Song | G06F 1/1652 | 345/204 |
| 2014/0152553 A1* | 6/2014 | Cha | G06F 3/013 | 345/156 |
| 2014/0210706 A1* | 7/2014 | Park | G06F 3/0487 | 345/156 |
| 2014/0247544 A1* | 9/2014 | Ryu | G09F 11/18 | 361/679.01 |
| 2014/0292717 A1* | 10/2014 | Kang | G06F 1/1626 | 345/174 |
| 2015/0029229 A1* | 1/2015 | Voutsas | G06F 1/1652 | 345/661 |
| 2015/0256803 A1* | 9/2015 | Alhazme | H04N 9/3185 | 348/746 |
| 2016/0283086 A1* | 9/2016 | Inagaki | G06F 1/1626 | |

FOREIGN PATENT DOCUMENTS

| | | |
|---|---|---|
| KR | 10-2007-0105214 A | 10/2007 |
| KR | 10-2010-0027501 A | 3/2010 |
| KR | 10-2011-0132064 A | 12/2011 |
| KR | 10-2012-0045177 A | 5/2012 |
| KR | 10-2013-0113895 A | 10/2013 |
| KR | 10-2014-0051013 A | 4/2014 |
| KR | 10-2014-0075859 A | 6/2014 |
| KR | 10-1533642 B1 | 7/2015 |
| WO | 2014200151 A1 | 12/2014 |

* cited by examiner (16:9)

DISPLAY APPARATUS AND METHOD FOR DISPLAYING

CROSS-REFERENCE TO RELATED APPLICATION(S)

This application claims the benefit under 35 U.S.C. § 119(a) of a Korean patent application filed on Apr. 16, 2015 in the Korean Intellectual Property Office and assigned Serial number 10-2015-0053875, the entire disclosure of which is hereby incorporated by reference.

TECHNICAL FIELD

The present disclosure relates to a display apparatus and a method for displaying. More particularly, the present disclosure relates to a display apparatus capable of adjusting a screen size a flexible display adaptively according to a size of a content.

BACKGROUND

With the development of information-oriented society, a demand for display apparatuses have increased, and recently, various display apparatus such as a liquid crystal display (LCD) device, a plasma display panel (PDP), an electro luminescent display (ELD), a vacuum fluorescent display (VFD), and the like, have been researched and used.

From among the display apparatuses, a flexible display apparatus, which is not damaged even if the apparatus is folded or rolled, will be expected to be rising technology in the field of a display.

Currently, various obstacles are present in embodying a flexible display apparatus; however, with the development of technology, a thin film LCD device, an organic light emitting diodes (OLED) device, an electrophoretic display, and the like, have been subjects of development.

As such, a flexible display may change a size of a screen displayed to a user by folding or rolling the display, but in the related art, a change of screen size was only used to move a display apparatus. That is, when used, a flexible display apparatus was unfolded, and when not used, the flexible display apparatus was rolled and stored.

Also, in the related art, only a user interaction in a flexible display apparatus of a portable size which may be carried around by a user was considered, and not an interaction in a flexible display apparatus of a large size which is furnished in household.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus capable of adjusting a screen size of a flexible display adaptively according to a size of a content and a method for displaying.

In accordance with an aspect of the present disclosure, a display apparatus is provided. The display apparatus includes a flexible display to display an image, a driver to vary a screen size of the flexible display, and a processor to control the driver to display an image corresponding to the content at a screen size corresponding to a size of a content to be displayed in the flexible display.

In this case, the processor may determine a screen ratio of the content, and control the driver such that the flexible display has a screen size corresponding to the determined screen ratio.

The flexible display has a display area which is flat and which is rollable towards one side, and the driver may vary a screen size of the flexible display by rolling part of the display area.

In this case, the driver may vary a width of the flexible display by rolling the display area in a horizontal direction of the display apparatus.

Meanwhile, the processor may, in response to a particular event occurring, control the driver and the flexible display such that a user interface (UI) element corresponding to the particular event is displayed at a screen size corresponding to the UI element.

In this case, the particular event is a command to drive a smart television (TV) function, and the processor may control a channel list to be displayed at a preset first screen size, and in response to any one of the displayed channel list being selected, control a content corresponding to the selected channel to be displayed at a second screen size which is larger than the first screen size.

Meanwhile, the particular event is a reception of a notification message regarding an event or state change occurred in a device connected to the apparatus within a home network, and the processor may control the notification message to be displayed at a preset first screen size, and in response to the notification message being selected, controls device information corresponding to the notification message to be displayed at a second screen size which is larger than the first screen size.

Meanwhile, the processor may, while changing a screen size of the flexible display, vary a size of an image corresponding to the content and display the image.

Alternatively, the processor may, while changing a screen size of the flexible display, fix a size of an image corresponding to the content and display the image.

Alternatively, the processor may, while changing a screen size of the flexible display, further control an image corresponding to the content not to be displayed.

Meanwhile, the processor may, while changing a screen size of the flexible display, further display a UI element unrelated to the content.

Meanwhile, the present display apparatus further includes a communication interface which receives screen size information from an external apparatus, and the processor may control the driver to display the image at a screen size corresponding to the received size information.

In accordance with another aspect of the present disclosure, a displaying method of a display apparatus is provided. The display method including a flexible display includes determining a screen size of the flexible display corresponding to a size of a content to be displayed in the flexible display, changing a screen size of the flexible display to have the determined screen size, and displaying an image corresponding to the content using the flexible display.

In this case, the determining may include determining a screen ratio of the content, and determining a screen size corresponding to the determined screen ratio.

Meanwhile, the changing may include changing a width of the flexible display by rolling a display area which is flat in a horizontal direction of the display apparatus.

Meanwhile, the determining may include, in response to a particular event occurring, determining a screen size corresponding to a screen ratio of a UI element corresponding to the particular event, and the displaying may include displaying the UI element.

Meanwhile, the displaying may, while changing a screen size of the flexible display, vary a size of an image corresponding to the content and display the image.

Meanwhile, the displaying may, while changing a screen size of the flexible display, fix a size of an image corresponding to the content and display the image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms such as first and second, and the like, may be used to distinguish one entity from another entity, without necessarily implying any actual relationship or order between such entities.

The terms, "include," "comprise," "is configured to," etc. of the description are used to indicate the existence of features, numbers, operations, elements, parts or combination thereof, and do not exclude the possibilities of combination or addition of one or more features, numbers, operations, elements, parts or combination thereof.

In an embodiment, 'a module' or 'a unit' performs at least one function or operation, and may be realized as hardware, firmware, software, or combination thereof. In addition, a plurality of 'modules' or a plurality of 'units' may be integrated into at least one module and may be realized as at least one processor (not illustrated) except for 'modules' or 'units' that should be realized in a specific hardware.

Hereinafter, the present disclosure will be described in detail with reference to the accompanying drawings.

Figure 1:
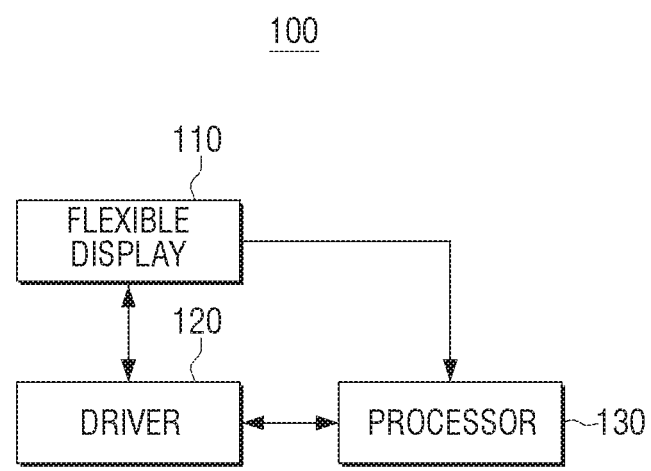
FIG. 1 is a block diagram illustrating briefly a configuration of a display apparatus according to an embodiment of the present disclosure.

FIG. 1 is a block diagram illustrating an example of a basic configuration of a display apparatus according to various embodiments of the present disclosure. The display apparatus 100 of FIG. 1 may be embodied as various types of apparatuses, such as television (TV), personal computer (PC), laptop PC, mobile phone, tablet PC, personal digital assistant (PDA), Moving Picture Experts Group phase 1 or phase 2 (MPEG-1 or MPEG-2) audio layer 3 (MP3) player, kiosk, electronic frame, table display device, and the like. When the display device is embodied as a portable-type device, such as a mobile phone, a tablet PC, a PDA, an MP3 player, a laptop PC, and the like, the display device may be called a mobile device, but it will be described as a display apparatus as a whole in the present specification.

Referring to FIG. 1, a display apparatus 100 includes a flexible display 110, a driver 120, and a processor 130.

The flexible display 110 may be bent from a flat state, and may be flat again from a bent state. Specifically, the flexible display 110 has an area which is flat and can be rolled to one side, and when part of a display area is rolled, the display area may be divided into a main area which displays an image and an area to be rolled which does not display an image.

In addition, the flexible display 110 displays an image. Specifically, the flexible display 110 may display an image on a display area which is not rolled, from among the entire area of the flexible display 110.

The driver 120 is configured to change a screen size of the flexible display 110. Specifically, the driver 120 may change a screen size of the flexible display 110 by rolling part of the flexible display 110. For example, when the flexible display 110 may be rolled in a horizontal direction, the driver 120 may roll a display area in a horizontal direction of the flexible display 110 and change a horizontal length of the flexible display 110.

The processor 130 is configured to control each component in the display apparatus 100. Specifically, the processor 130 may detect a size at which a content will be displayed in the flexible display 110, and determine a screen size of the flexible display 110 which correspond to the detected size of the content. For example, when the flexible display 110 may change its horizontal length by being rolled in a horizontal direction, a vertical length is fixed. Therefore, the processor 130 may determine a screen ratio of the content, and calculate a horizontal length based on the fixed vertical length and the screen ratio of the content, and control the driver 120 to have the calculated horizontal length.

In addition, the processor 130 is configured to detect whether a particular event has occurred. In this case, an event may be set in various ways, such as an event where a user gesture is detected, an event where a system alarm is generated, an event where a particular program is executed or ended, and the like.

In addition, the processor 130 may control the driver 120 and the flexible display 110 to control a user interface (UI) element corresponding to a particular event to be displayed at a screen size corresponding to the UI element. A type, display method, layout, and the like, of a content displayed in the flexible display 110 may be changed in various ways according to various embodiments. The above will be described in detail below. In this case, a UI element is a graphic object which may be displayed in a display apparatus. The UI element may be a content itself, or may be an image, a graphic image, and a video, and the like, such as a thumbnail and icon with respect to the content, an icon corresponding to a menu, and etc.

As described above, the display apparatus 100 according to an embodiment may automatically change a size of the flexible display 110 adaptively to a size of a content, and a distortion of an image or an efficient use of a display may thus be prevented. In addition, various user interfaces may be provided in response to a shape of a display apparatus.

Figure 2:
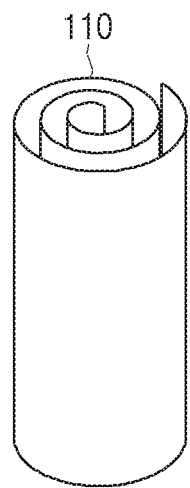
FIGS. 2, 3, and 4 are views illustrating specific forms of a flexible display according to various embodiments of the present disclosure.
Figure 3:
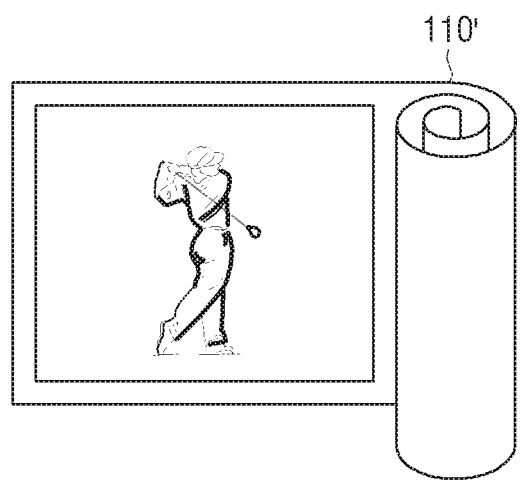
Figure 4:
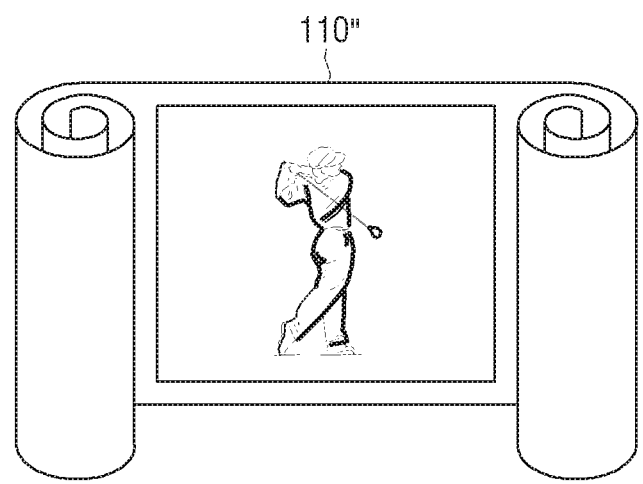

FIGS. 2 to 4 are views illustrating specific shapes of a flexible display 110 according to various embodiments of the present disclosure. Specifically, FIG. 2 is a view illustrating a flexible display 110 of which the entire area is rolled, FIG. 3 is a view illustrating a flexible display 110 of which one side is rolled, and FIG. 4 is a view illustrating a flexible display 110 of which both sides are rolled.

Referring to FIGS. 2 and 3, an area to be rolled refers to the entire area in which a flexible display apparatus is bent and is in a rolled state. As in FIG. 2, the entire area of a flexible display apparatus may be defined as an area to be rolled, when the flexible display 110 is rolled as a whole, and as in FIG. 3, a flexible display 110' may be partially rolled.

As illustrated in FIG. 3, the flexible display 110' may be divided into a flat display area and a rolling area. In this case, an image may be only displayed in the display area. Accordingly, the display apparatus 100 may change a screen size of a display by adjusting an area of the rolling area.

Meanwhile, it was described in FIG. 3 that a rolling area is only disposed in an area on the right side of the display area, but a rolling area of a flexible display 110" may be disposed on each of the left and right sides of a display area, as illustrated in FIG. 4. In this case, it has the advantage of changing a screen size of a display more quickly than FIG. 3. In this case, a rolling area to be rolled may be only stored in a main body of the display apparatus 100.

Meanwhile, it was described above that only a horizontal length of the flexible display is adjusted, but it may be embodied such that the flexible display is rolled in the direction of y-axis.

Meanwhile, it is beneficial that the rolling is carried out in the x-axis direction to provide various screen ratios. Specifically, a state-of-the-art display apparatus has a screen ratio of which the horizontal length is longer, such as 16:9 or 21:9, to display an image, such as a movie. When adjusting a horizontal length, a screen ratio that is more advantageous in providing an image, such as a ratio of a square (1:1), may be provided.

Figure 5A:
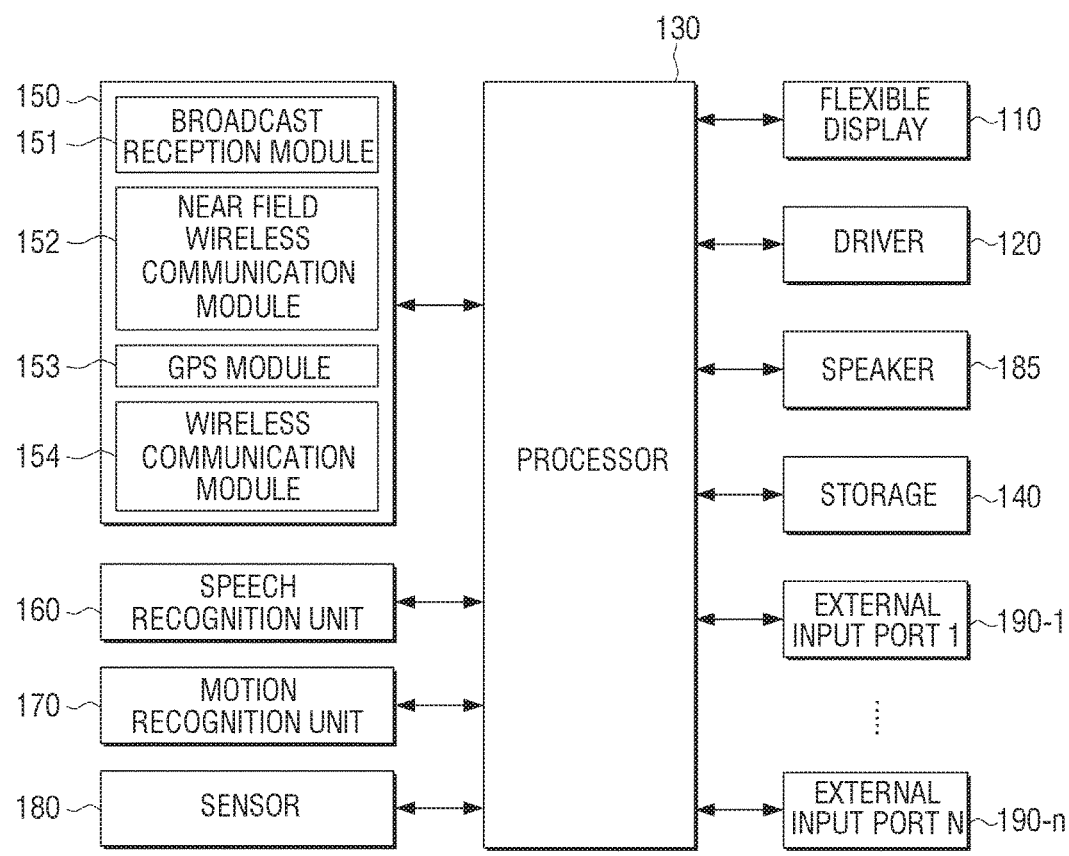
FIG. 5A is a block diagram illustrating in detail a configuration of display apparatus according to an embodiment of the present disclosure.

FIG. 5A is a block diagram illustrating a detailed configuration of a display apparatus according to an embodiment of the present disclosure.

Referring to FIG. 5A, a display apparatus 100 may include a flexible display 110, a driver 120, a processor 130, a storage 140, a communication interface 150, a speech recognition unit 160, a motion recognition unit 170, a sensor 180, a speaker 185, and external input ports 190-1 to 190-n.

The flexible display 110 is flexible. The flexible display 110 may be embodied as various forms of displays, such as a liquid crystal display (LCD), an organic light emitting diodes (OLED) display, a plasma display panel (PDP), and the like. The flexible display 110 may include a driving circuit which may be embodied in the form of amorphous silicon (a-Si) thin film transistor (TFT), low temperature poly silicon (LTPS) TFT, organic TFT (OTFT), and the like, a backlight unit, and etc. Meanwhile, the flexible display 110 may be combined with a touch sensor and be embodied as a flexible touch screen.

In this case, the touch sensor may include at least one of a touch panel and a pen recognition panel. The touch panel may detect input of a finger gesture of a user, and output a touch event value corresponding to the detected touch signal. The touch panel may be completely mounted under all areas of the flexible display 110 or may be only mounted under part of the areas of the flexible display 110. A method for detecting, by a touch panel, input of a finger gesture may include an electrostatic method and a pressure sensing type method. The electrostatic method is a method to calculate a touch coordinate by detecting nano electricity caused to a user's body. The pressure sensing method includes two electrode plates included in a touch panel, to calculate a touch coordinate by detecting a flow of current caused by a touch between upper and lower plates of a point of touch input.

The pen recognition panel may detect input of a pen gesture of a user according to an operation of a touch pen (for example, stylus pen) and a digitizer pen, and output a pen approach event value or a pen touch event value. The pen recognition panel may be mounted under at least one of a main area and a plurality of sub areas of the flexible display 110.

The pen recognition panel may be embodied, for example, in the electromagnetic resonance (EMR) method, and may detect input of a touch or an approach according to a change in strength of electromagnetic field by approach or touch of a pen. In more detail, the pen recognition panel may be configured to include electronic induction coil sensor (not illustrated) having a grid structure and an electronic signal controller (not illustrated) to sequentially provide an alternating current (AC) signal having a predetermined frequency to each loop coil of the electronic induction coil sensor.

When a pen including a resonant circuit is near a loop coil of such pen recognition panel, a magnetic field transmitted from the corresponding loop coil generates a current based on a mutual electronic induction to a resonant circuit in the pen. Based on this current, an inductive magnetic field is generated from a coil constituting the resonant circuit in the pen, and the pen recognition panel may detect this inductive magnetic field from a loop coil in a signal reception state to detect an approach position or a touch position of the pen.

The driver 120 is configured change a screen size of the flexible display 110. Specifically, the driver 120 may include a rotation roller capable of rolling partial area of the flexible display 110, and etc. Also, the driver 120 may drive the aforementioned moving member and motor to change a screen size of the flexible display 110. For example, when the flexible display 110 may change its horizontal length by rolling in the horizontal direction, the driver 120 may roll a display area in the horizontal direction of the flexible display 110 to change the horizontal length of the flexible display.

The processor 130 may display an image in a display area (an image display area other than a rolling area) of the flexible display 110 using a program or data stored in the storage 140. In addition, the processor 130, in response to an event occurring, performs a control operation corresponding to the event.

The processor 130 may include a random access memory (RAM) (not illustrated), a read only memory (ROM) (not illustrated), a central processing unit (CPU) (not illustrated), a graphics processing unit (GPU) (not illustrated), and bus (not illustrated). The RAM, the ROM, the CPU, the GPU, and the like, may be connected to each other through the bus.

The CPU is configured to access the storage 140 and perform booting using an operating system (OS) stored in the storage 140. In addition, the CPU performs various operations using various programs, content, data, and the like, stored in the storage 140.

The ROM is configured to store an instruction set for system booting, and the like. When a turn-on command is input and power is supplied, the CPU is configured to copy an OS stored in the storage 140 onto a RAM according to an instruction command stored in a ROM, and to boot a system by executing the OS. When the booting is complete, the CPU is configured to copy various programs stored in the storage 140 onto the RAM, and to perform various operations by executed the programs copied onto the RAM. The GPU is configured to, when the booting of the display apparatus 100 is complete, display a UI screen in a display area. Specifically, the GPU may generate a screen including various objects, such as an icon, an image, a text, and the like, using a computation unit (not illustrated) and a rendering unit (not illustrated). The computation unit is configured to compute an attribute value, such as a coordinate value, to which each of the objects is to be displayed, a form, a size, a color, and the like, according to a layout of the screen. The rendering unit is configured to generate a screen of various layouts including an object based on the attribute value computed in the computation unit. The screen generated in the rendering unit may be provided to the flexible display 110 and displayed in the display area of the flexible display 110.

The storage 140 may store various programs or data associated with operations of the display apparatus 100, setting information set by a user, a system operating software, various application programs, information regarding operations corresponding to user manipulations, and the like.

The sensor 180 may detect a bending state and a touch state of the entire display apparatus 100 as well as the flexible display 110. The sensor 180 may include various types of sensors, such as a touch sensor, a geo-magnetic sensor, an acceleration sensor, a bend sensor, a pressure sensor, a proximity sensor, a grip sensor, and the like.

In this case, the touch sensor may be embodied as a capacitive type or a pressure-sensing type. The capacitive type is a method to calculate a touch coordinate by detecting a nano electricity caused to a body of a user when part of body of the user touches a surface of a flexible display, based on a dielectric substance laminated onto the surface of the flexible display. The pressure-sensing type, which includes two electrode plates, is a method to calculate a touch coordinate by, when a user touches a screen, detecting flowing of a current when the upper plate and the lower plate touch at a point of touch input. The touch sensor may be embodied in various forms as described above.

The geo-magnetic sensor is a sensor to detect a rotation state and a moving direction of the display apparatus 100, and the acceleration sensor is a sensor to detect the degree of inclination of the display apparatus 100. As described above, the geo-magnetic sensor and the acceleration sensor may be respectively used to detect bending characteristics, such as a bending direction, a bending area, and the like, of the display apparatus 100, but may be additionally used to detect a rotation state or an inclined state of the display apparatus.

The bend sensor may be embodied as various forms and various numbers, and detect a bending state of the flexible display 110.

The pressure sensor is configured to, when a user performs touch or a bending operation, detect a size of a pressure applied to the flexible display 110 and provide the size of the pressure to the processor 130. The pressure sensor may be mounted in the flexible display 110, and include a piezo film to output an electric signal corresponding to the size of the pressure. Meanwhile, when the touch sensor is embodied as a pressure-sensing type touch sensor, the pressure-sensing type touch sensor may serve as a pressure sensor as well.

The pressure sensor is a sensor to detect a motion which approaches to, without directly touching, a surface of a display. The pressure sensor may be embodied as a sensor of various forms, such as a high frequency oscillator type which detects current induced by magnetic field attributes that is changed when an object approaches, a magnetic type which uses a magnet, and an electrostatic capacitance type which detects capacitance that is changed due to approach of a target object.

The grip sensor is a sensor which is disposed in an edge or a handle of the display apparatus 100 independent from the pressure sensor, and detects a grip of a user. The grip sensor may be embodied as a pressure sensor or a touch sensor.

The processor 130 may analyze various detection signals detected in the sensor 180 and identify a user's intention, and perform an operation conforming to the intention. As an example, the processor 130 may process data acquired through communication with an external apparatus or data stored in the storage 140 and output the data through the flexible display 110, the speaker 185, and the like. In this case, the processor 130 may communicate with the external apparatus using the communication interface 150.

The communication interface 150 is configured to communicate with various types of external apparatuses according to various types of communication methods. The communication interface 150 may include a broadcast reception module 151, a near field wireless communication module 152, a global positioning system (GPS) module 153, a wireless communication module 154, and the like.

In this case, the broadcast reception module 151 may include a terrestrial broadcast reception module (not illustrated) which includes an antenna, a demodulator, an equalizer, and the like, to receive a terrestrial broadcast signal, a digital multimedia broadcasting (DMB) module to receive and process a DMB broadcast signal, and etc. The near field wireless communication module 152 is a module to communicate with an external apparatus located in a proximate distance according to a near field wireless communication method, such as near field communication (NFC), Bluetooth, ZigBee, or the like.

The GPS module 153 is a module to receive a GPS signal from a GPS satellite and detect a current position of the display apparatus 100. The wireless communication module 154 is a module which communicates by being connected to an external network according to a wireless communication protocol, such as WiFi, Institute of Electrical and Electronics Engineers (IEEE), and the like. Additionally, the wireless communication module 154 may further include a mobile communication module which communicates by accessing a mobile communication network according to various mobile communication specifications, such as a 3rd generation (3G), a 3rd generation partnership project (3GPP), a long term evolution (LTE), and the like.

The processor 130 may perform an operation by selectively activating elements required to perform an operation intended by a user from among elements of the aforementioned communication interface 150.

Meanwhile, the processor 130 may also recognize a voice input or a motion input other than a bending operation or a touch operation and perform an operation corresponding to that input. In this case, the processor 130 may activate the voice recognition unit or the motion recognition unit 170.

The speech recognition unit 160 is configured to collect a voice or a user or external sounds using a sound acquisition means, such as a microphone (not illustrated), and then transmit the same to the processor 130. The processor 130 may, in the state that the processor 130 is operated in a voice control mode, when a voice of a user is consistent with a predetermined voice command, perform a task corresponding to the user voice. A task controllable using a voice may include various tasks, such as screen size adjustment, volume adjustment, channel selection, channel japing, display attribute adjustment, reproduction, pause, rewind, fast forward, application execution, menu selection, turning on apparatus, turning off apparatus, and the like.

Meanwhile, the motion recognition unit 170 is configured to acquire an image of a user using an image photographing means (not illustrated), such as a camera, and then provide the acquired image to the processor 130. If the processor 130 is operated in a motion control mode, the processor 130 is configured to analyze the user image and, when it is determined that the user made a motion gesture corresponding to a preset motion command, perform an operation corresponding to the motion gesture. For example, various tasks, such as screen size adjustment, channel japing, turning on apparatus, turn off apparatus, pause, reproduction, pause, rewind, fast forward, mute, and the like, may be controlled by a motion. The aforementioned examples of a task controllable by voice, a task controllable by motion, and the like, are merely examples, and it is not limited thereto.

Other than the above, external input ports 1, 2 to n 190-1 to 190-n may be respectively connected to various types of external apparatuses, and receive various data programs, control commands, and the like. Specifically, the external input ports may include a universal serial bus (USB) port, a headset port, a mouse port, a local area network (LAN) port, and the like.

Additionally, although not illustrated in FIG. 5A, according to an embodiment, the display apparatus 100 may as well include therein a USB port to which a USB connector may be connected, various external input ports to connect to various external terminals, such as a headset, a mouse, a LAN, and the like, a DMB chip which receives and processes a DMB signal, various sensors, and the like.

Meanwhile, as described above, the storage 140 may store various programs.

Figure 5B:
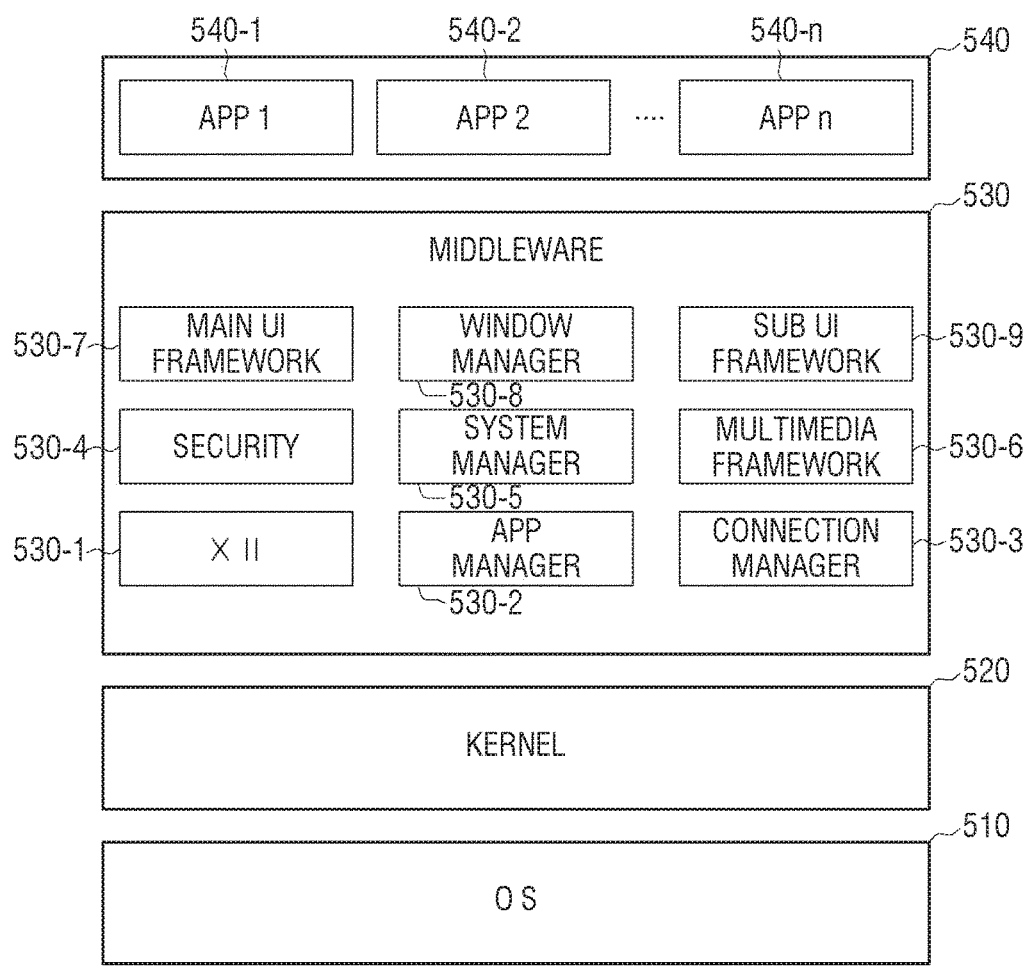
FIG. 5B is a view illustrating an example of a software configuration of a user terminal device according to an embodiment of the present disclosure.

FIG. 5B is a view to explain a structure of a software stored in the display apparatus 100 according to an embodiment of the present disclosure. According to FIG. 5B, the storage 140 may store a software including an OS 510, a kernel 520, a middleware 530, an application module 540, and the like.

Referring to FIG. 5B, the OS 510 is configured to perform a function of controlling and managing an overall operation of a hardware. That is, the OS 510 is a class in charge of basic functions, such as hardware management, memory, security, and the like.

The kernel 520 serves as a channel through which various signals, such as a touch signal detected in the flexible display 110, are transmitted to the middleware 530.

The middleware 530 includes various software modules to control operations of the display apparatus 100. According to FIG. 5B, the middleware 530 includes an X11 module 530-1, an APP manager 530-2, a connection manager 530-3, a security module 530-4, a system manager 530-5, a multimedia framework 530-6, a UI framework 530-7, a window manager 530-8, and a sub UI framework 530-9.

The X11 module 530-1 is a module to receive various event signals from various hardware included in the display apparatus 100. In this case, the event may be set in various ways, such as an event that a user gesture is detected, an event that a system alarm occurs, an event that a particular program is executed or ended, and the like.

The APP manager 530-2 is a module to manage an execution state of various applications 540 installed in the storage 140. The APP manager 530-2 is configured to, when an application execution event is detected from the X11 module 530-1, call an application corresponding to the event and execute the application.

The connection manager 530-3 is a module to support a wired or wireless network connection. The connection module 530-3 may include various detailed modules, such as a DNET module, a universal plug and play (UPnP) module, and the like.

The security module 530-4 is a module to support a certification, permission, secure storage, and the like, with respect to hardware.

The system manager 530-5 is configured to monitor a state of each of the elements in the display apparatus 100, and to provide the monitoring result to other modules. For example, in the cases of lack of battery, errors, disconnection from network, and the like, the system manager 530-5 may provide the monitoring result to a main UI framework 530-7 or a sub UI framework 530-9 and output a notification message or an alert sound.

The multimedia framework 530-6 is a module to reproduce multimedia content which is stored in the display apparatus 100 or is provided from an external source. The multimedia framework 530-6 may include a player module, a camcorder module, a sound processing module, and the like. Accordingly, the multimedia framework 530-6 may generate a screen and sound corresponding to various multimedia content and reproduce the same.

The main UI framework 530-7 is a module to provide various UIs to be displayed in the flexible display 110, and the sub UI framework 530-9 is a module to, when the sub UI framework includes a sub area, provide various UIs to be displayed in the corresponding sub area. The main UI framework 530-7 and the sub UI framework 530-9 may include an image compositor module to configure various objects, a coordinate compositor module to calculate coordinates on which the objects are to be marked, and a rendering module to render the configured objects to the calculated coordinates, a two-dimensional or three-dimensional UI tool kit which provides a tool to configure a two-dimensional or three-dimensional UI, and the like.

The window manager 530-8 may detect a touch event or other input events using a body of a user or using a pen. The window manager 530-8 is configured to, when such event is detected, transmit an event signal to the main UI framework 530-7 or the sub UI framework 530-9 and control an operation corresponding to the event to be performed.

Other than the above, the middleware may store various program modules, such as a writing module to, when a user touch-and-drags the screen, draw a line according to the trace of the drag, a position calculation module to calculate a user position based on a ultrasonic sensor value detected in the sensor 180, a sight calculation module to calculate a direction of a user sight of a user image photographed in a photographing unit (not illustrated), or the like.

The application module 540 includes applications 540-1 to 540-n to support various functions. For example, the application module may include a program module to provide various services, such as a GPS program module, a game module, an electronic book module, a calendar module, an alarm management module, and the like. Such applications may be installed in default, and may as well be arbitrarily installed in the usage process and used. The CPU 230 may, when an object is selected, execute an application corresponding to the selected object using the application module 540.

The software structure illustrated in FIG. 5B is merely an example, and it is thus not limited thereto. Accordingly, some of the elements may as well be omitted, modified, or added as needed. For example, the storage 140 may additionally have various programs, such as a sensing module to analyze signals sensed by various sensors, a messaging module including a messenger program, a short message service (SMS) and multimedia message service (MMS) program, and an e-mail program, a call info aggregator program module, a voice over Internet protocol (VoIP) module, a web browser module, or the like.

Meanwhile, as described above, the display apparatus 100 may be embodied as various types of apparatus, such as a mobile phone, a tablet PC, a laptop PC, a PDA, a MP3 player, an electronic frame apparatus, a TV, a PC, a kiosk, and the like. Accordingly, the features described in FIGS. 5A and 5B may be modified in various ways according to a type of the display apparatus 100.

As described above, the display apparatus 100 may be embodied in various forms and configurations. The processor 130 of the display apparatus 100 may support various user interactions according to an embodiment.

Hereinafter, a method of user interaction according to various embodiments will be described in detail.

As an embodiment, the processor 130 is configured to determine whether to change a screen size of the display apparatus 100. Specifically, the processor 130 is configured to determine a screen size (or screen ratio) of a content to be displayed in the display 100, and to identify a current screen size (or display area) of the display 100.

Accordingly, when the current screen size and the screen size of the content are different from each other, the processor 130 may determine to change the screen size of the display 100, and control the driver 120 such that the current screen size is identical to the screen size corresponding to the content. Then, the processor 130 may display an image corresponding to a new content on a display area of which size is changed.

Meanwhile, when the current screen size and the screen size of the content are identical to each other, the processor 130 may control a new content to be displayed immediately on a display area of the flexible display 110 without changing of screen size of the flexible display 110.

In a situation as such, when a particular event occurs, the processor 130 may display a UI element corresponding to the particular event on the flexible display. In this case, the processor 130 may, when the UI element which corresponds to the particular event and is displayed differs from the current screen size, control the driver 120 such that the flexible display 110 has a screen size that is the same as the screen size corresponding to the UI element.

Figure 6A:
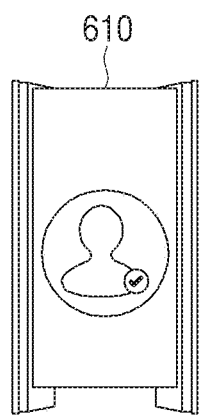
FIGS. 6A to 6C, 7A to 7E, 8A to 8C, 9A to 9C, 10A to 10B, 11A to 11B, 12A to 12C, 13A to 13B, 14A to 14C, 15A to 15B, and 16A to 16C are views provided to explain various embodiments to control a display apparatus using a flexible display according to various embodiments of the present disclosure.

For example, when a user recognition is complete as a result of voice recognition, face recognition, and the like, as illustrated in FIG. 6A, the flexible display 610 may display information corresponding to a user account. When the user account is certified, the flexible display 620 may display a content frequently watched by the user or a recently-watched content in the form of menu UI, as illustrated in FIG. 6B.

Figure 6B:
Figure 6C:
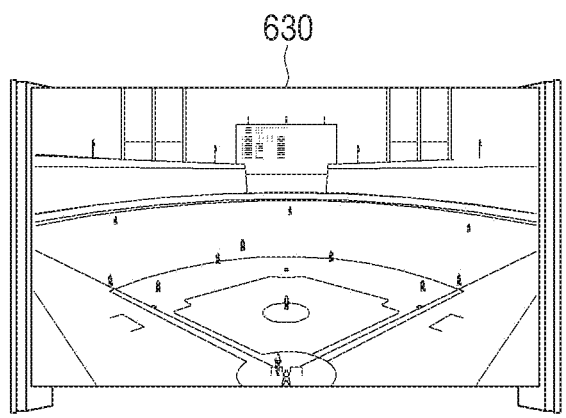

In this case, when a user selects any one content, a flexible display 630 may be enlarged to a screen size corresponding to the content selected by the user—for example, the flexible display 630 is enlarged in a horizontal direction as illustrated in FIG. 6C—and display the content selected by the user in the enlarged screen.

FIGS. 6A to 6C are views provided to explain various embodiments to control a display apparatus using a flexible display according to various embodiments of the present disclosure.

Meanwhile, as for the flexible display 110 in the illustrated embodiment, when the flexible display 110 is disposed as in FIG. 4, a rolling area on the left side is rolled into a rotation roller within a left body of the display apparatus, and a rolling area on the right side is rolled into a rotation roller within a right body of the display apparatus. Thus, flexible display 110 may be rolled or unrolled to vary a size of a display apparatus. In some embodiments, different sides may be rolled or unrolled independently.

FIGS. 7A to 7E are views illustrating an example of a user interface window when a display apparatus is in a content reproduction mode according to various embodiments of the present disclosure.

Figure 7A:
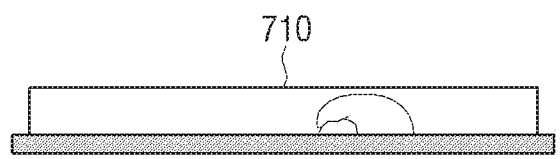
Figure 7B:
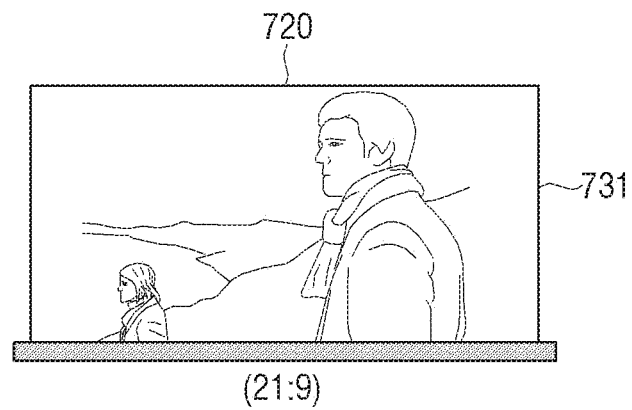

Referring to FIG. 7A, the content reproduction mode is a mode to display a content reproducible in the display apparatus 710. When a user selects the content reproduction mode, as illustrated in FIG. 7B, a size of a display area 720 may be changed such that the size of the display area is identical to a screen size (e.g. 21:9) corresponding to a content selected by the user.

Figure 7C:
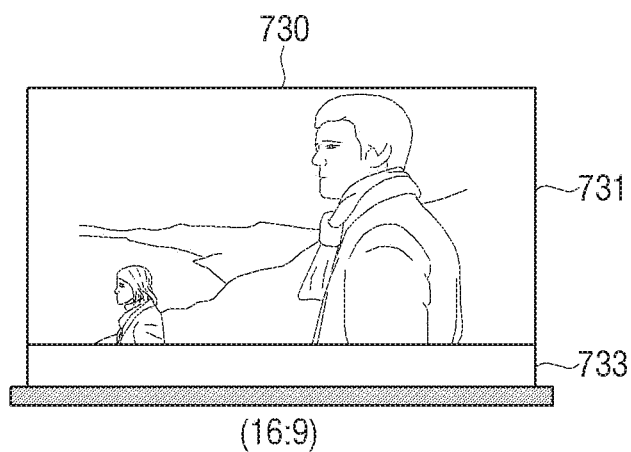

While watching the screen, the user may wonder information of another channel. In this case, when the user requests information of the another channel, as illustrated in FIG. 7C, the display apparatus 100 may further enlarge a screen size of the flexible display apparatus 730, to thereby distinguish between a main area 731 to display a basic content and a sub area 733 to display additional information.

Figure 7D:
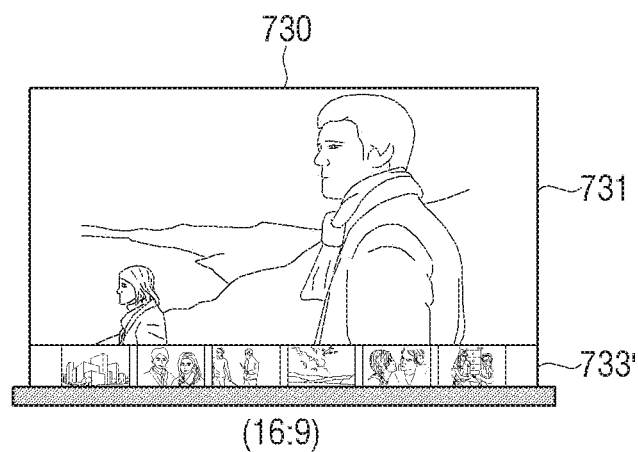

The distinguished sub area 733' may display information of another channel as illustrated in FIG. 7D. Meanwhile, according to an embodiment, the sub area 733' may display not only information of another channel but also a notification message received by another apparatus within a home network.

Figure 7E:
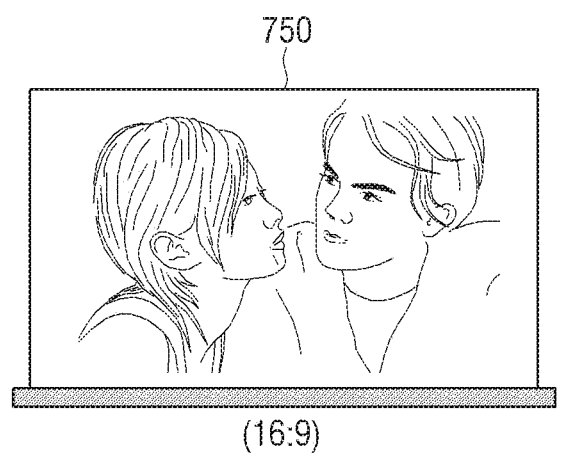

In addition, when the user selects another content in the sub area 733, the display apparatus 750 may change a screen size such that the screen size is identical to a screen size corresponding to the selected content, and display the content having the changed screen size as illustrated in FIG. 7E.

Figure 8A:
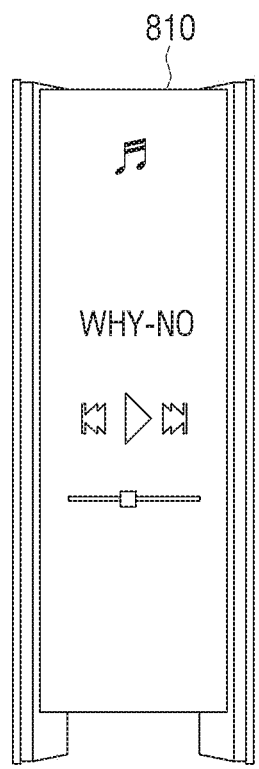
Figure 8B:
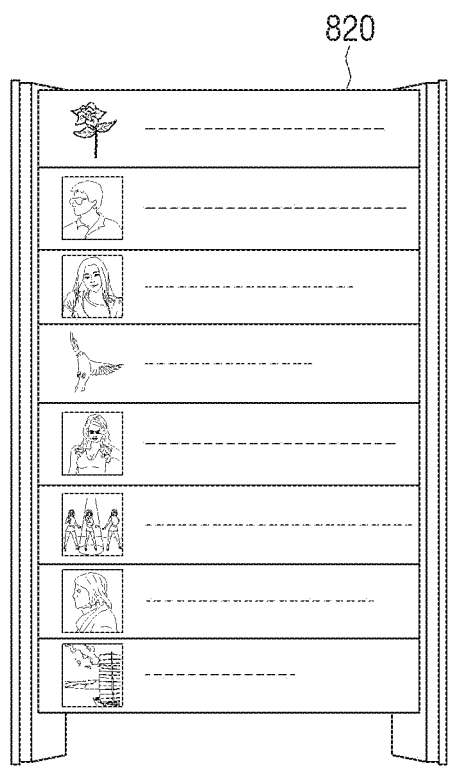
Figure 8C:
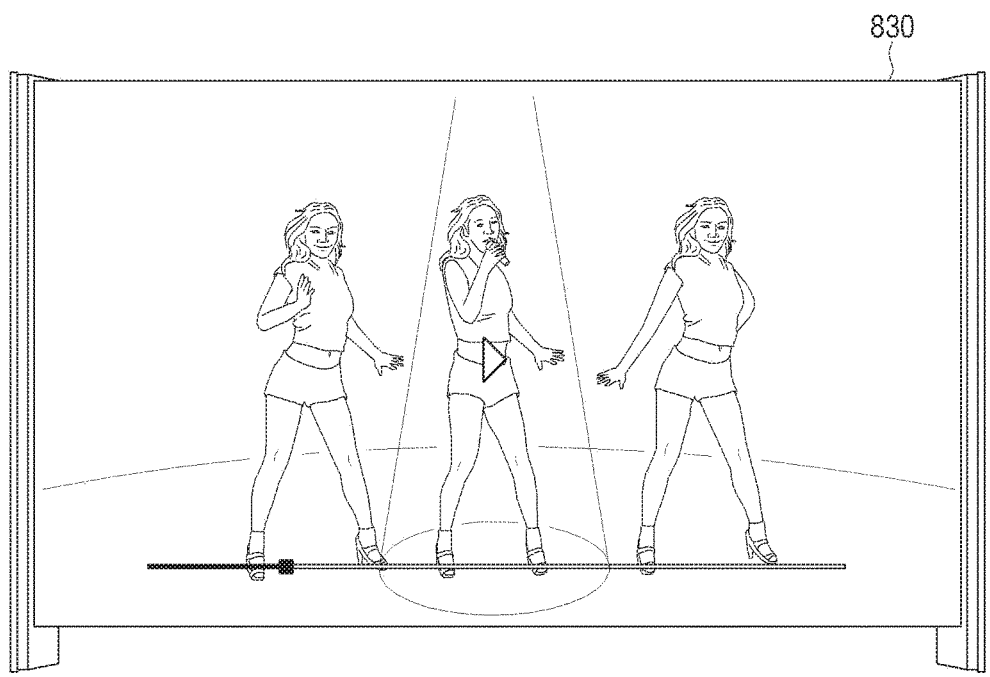

FIGS. 8A to 8C are views illustrating an example of a user interface window when a display apparatus is in a music reproduction mode according to various embodiments of the present disclosure.

Referring to FIG. 8A, a display area 810 is configured to only display a basic UI element, such as information regarding music content currently being reproduced. In this case, when a user requests a reproduction list, the display apparatus 100 may enlarge a size of a display area 820, as illustrated in FIG. 8B, to display the reproduction list larger.

Referring to FIG. 8B, the display area 820 which has been enlarged in a horizontal direction may display a current reproduction list of the apparatus in the form of list.

When a user selects any one from among a displayed reproduction list, the display apparatus 100 may, to reproduce the corresponding content, change a screen size of the flexible display 830 such that the flexible display 830 has a screen size corresponding to the corresponding content, and display the user selected content in an enlarged size as illustrated in FIG. 8C.

Figure 9A:
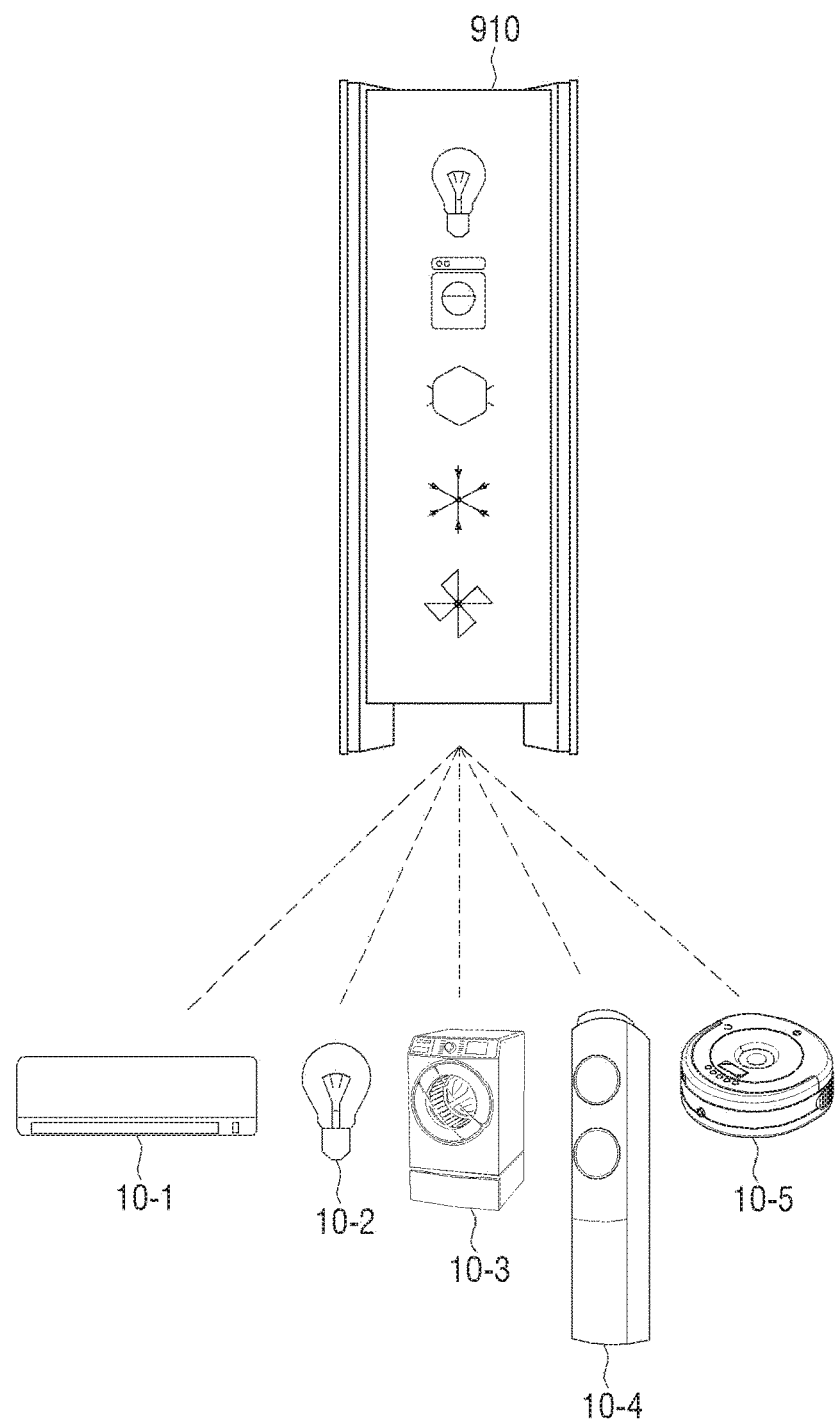
Figure 9B:
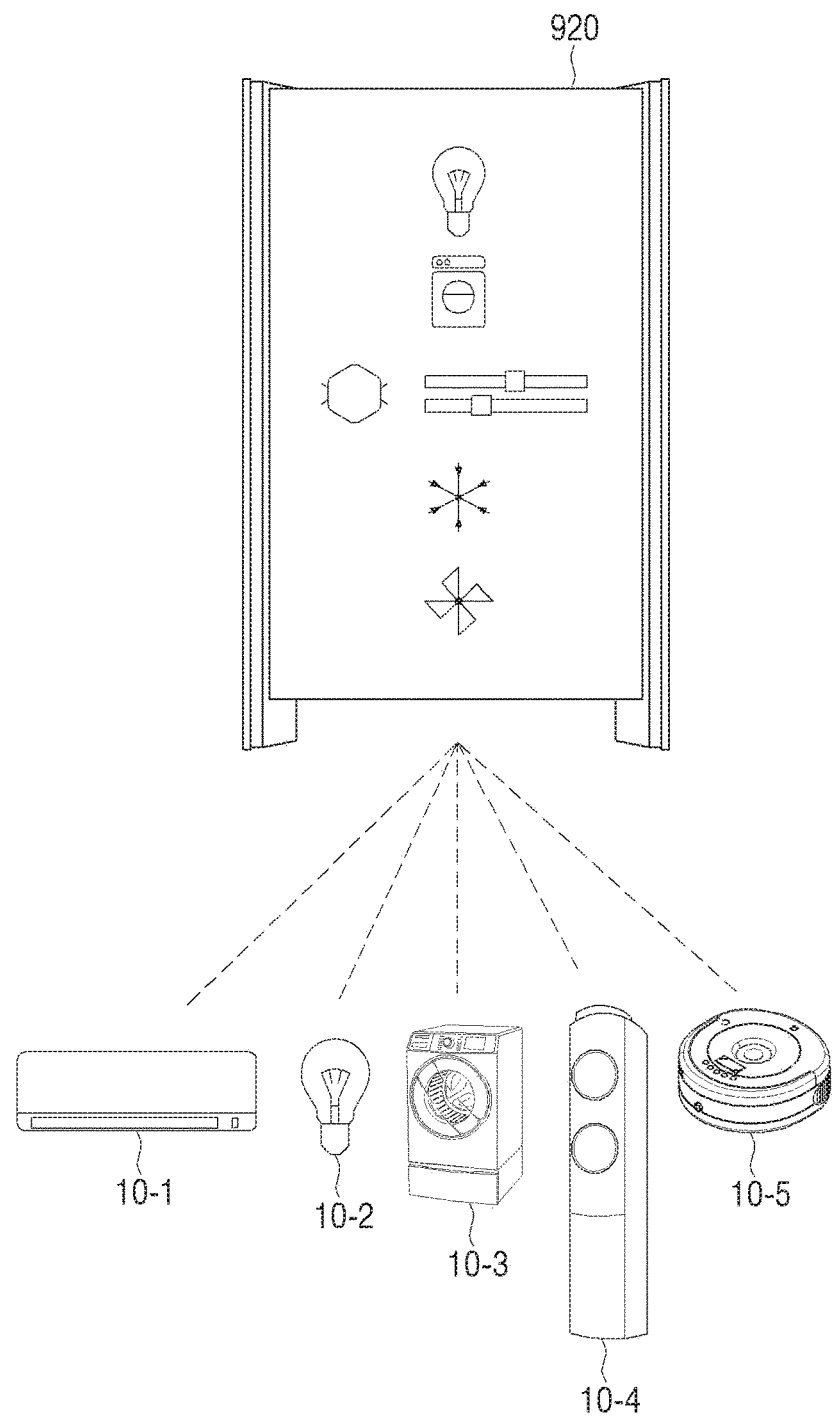
Figure 9C:
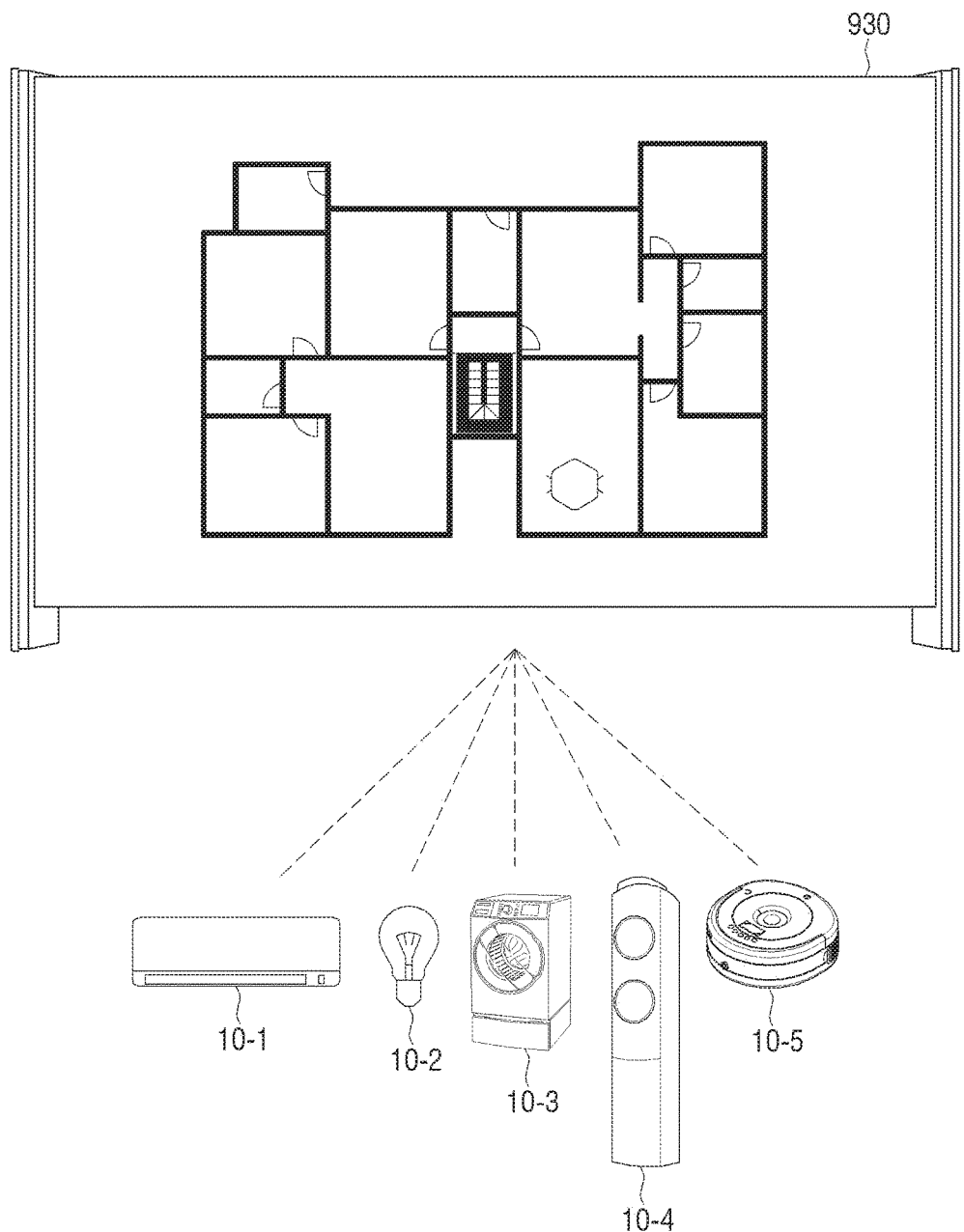

FIGS. 9A to 9C are views illustrating an example of a user interface window when a display apparatus is in a smart home mode according to various embodiments of the present disclosure.

Referring to FIGS. 9A to 9C, the smart home mode is an area which controls another terminal apparatus directly connected to the display apparatus or home appliances within a home network, and the like, or which provides information to check a state of the corresponding apparatus. Accordingly, when a user selects the smart home mode, a display area 910 is configured to display a UI element corresponding to the each of terminal apparatuses currently connectable with the display apparatus in a minimum size (e.g., terminal apparatuses 10-1 through 10-5).

When the user selects any one from among a plurality of displayed apparatuses, the display area 920 may together display an operation UI element corresponding to the selected apparatus as illustrated in FIG. 9B.

If necessary, a display area 930 may be enlarged as illustrated in FIG. 9C, and display information corresponding to the apparatus selected by the user in a large screen.

FIGS. 10A to 10B and 11A to 11B are views illustrating examples of an operation when the length of a display apparatus may be adjusted in a vertical direction according to various embodiments of the present disclosure.

Figure 10A:
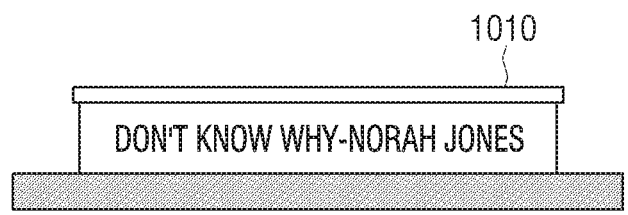
Figure 10B:

Referring to FIGS. 10A and 10B, a display area 1010 is configured to only display a simple UI element, such as information of a music content currently being reproduced. In this case, if a user wants to watch a music video of the music content currently being reproduced and gives a command through a voice message, the display apparatus 100 may retrieve a video content corresponding to the corresponding music content, and change a screen size of the flexible display 110 such that the screen has a screen ratio (for example, 16:9) corresponding to the retrieved video content. Then, the display apparatus 100 may display the retrieved video content in a changed display area 1020.

Meanwhile, it was described above that a lower end of the display area 1010 is rolled and it extends upward; however, the flexible display may be as well embodied in such a manner that an upper area of the flexible display is rolled and it extends downward.

Figure 11A:
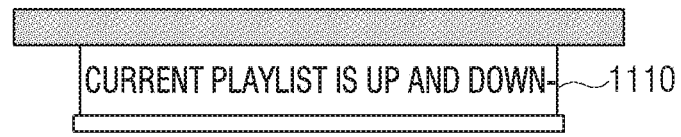
Figure 11B:
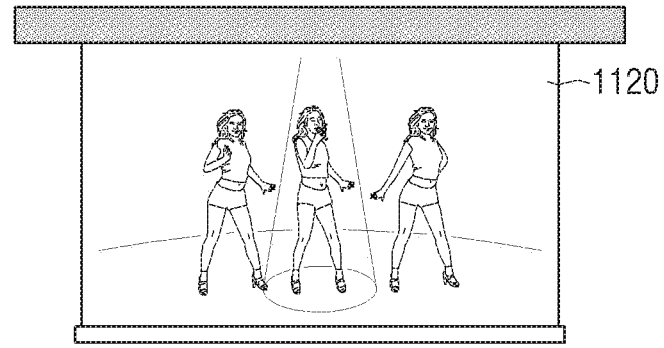

Referring to FIGS. 11A and 11B, a display area 1110 is configured to only display a simple UI element, such as information corresponding to a music content currently being reproduced. In this case, if a user wants to watch a music video of the music content currently being reproduced and gives a command using a remote controller, the display apparatus 100 may retrieve a video content corresponding to the corresponding music content, and change a screen size of the flexible display 110 such that the screen has a screen ratio (for example, 16:9) corresponding to the retrieved video content. Then, the display apparatus 100 may display a video content retrieved in a changed display area 1120.

Meanwhile, it was described above that a size of a display area is gradually enlarged according to a user's manipulation; however, according to an embodiment, a size of a display area may as well be reduced according to a user's manipulation.

In addition, it was described above that when a content to be displayed is changed, a screen size is changed to correspond to the changed content, and the content is displayed in a screen having the changed size. However, according to the present embodiment, a screen size of the flexible display 110 is changed physically, and thus, the changing process may take some time. Accordingly, it will be described below as to in which form a content is to be displayed while a screen size is being changed.

First, as a first example, a size of an image corresponding to a content may be fixed and displayed while a screen size of the flexible display is being changed. In this regard, it will be described with reference to FIGS. 12A to 12C.

Figure 12A:
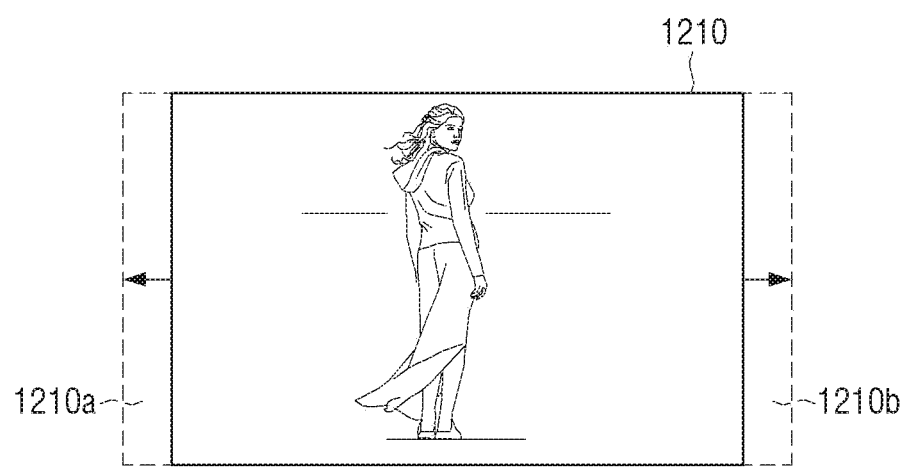
Figure 12B:
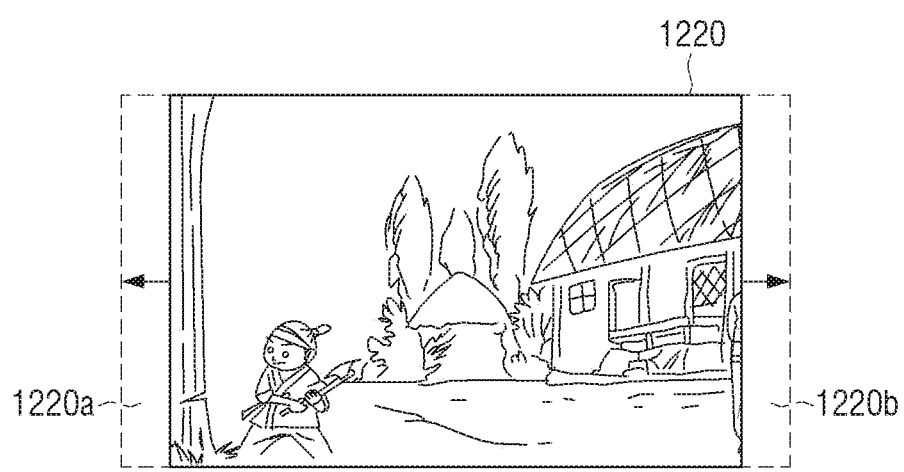
Figure 12C:
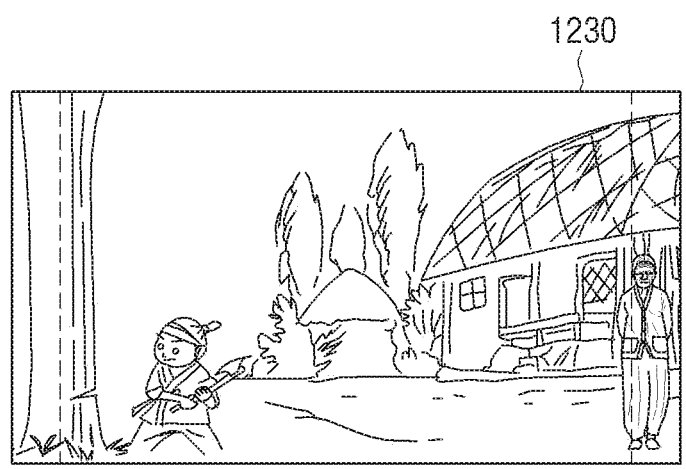

FIGS. 12A to 12C are user interface windows, according to various embodiments of the present disclosure.

Referring to FIG. 12A, a user interface window 1210 is configured to display a first content of a first screen size (4:3). In this case, a user may input a reproduction command of a second content of a second screen size (16:9). Since a screen size of the second content is larger, the flexible display 110 may be extended to the left and right by areas 1210a and 1210b.

During an extension as such, a user interface window 1220 is configured to display the second content according to a current screen size as illustrated in FIG. 12B. However, since a current screen size of the flexible display does not have the screen size of the second content, the flexible display is not able to display a screen corresponding to left and right areas 1220A, 1220B of the second content.

However, as a screen of the flexible display 110 is extended leftward and rightward additionally, a user interface window 1230 may finally display the entire screen of the second content as illustrated in FIG. 12C.

Meanwhile, in the method as illustrated in FIGS. 12A to 12C, a center area may continuously display an image in the transfer process, which has the advantage that a change of an image is not significant in the transfer process. However, it has the drawback that some areas of the image may not be displayed.

Accordingly, as a second example, a size of an image corresponding to a content may be changed and displayed while a screen size of the flexible display is being changed. In this regard, it will be described with reference to FIGS. 13A and 13B.

Figure 13A:
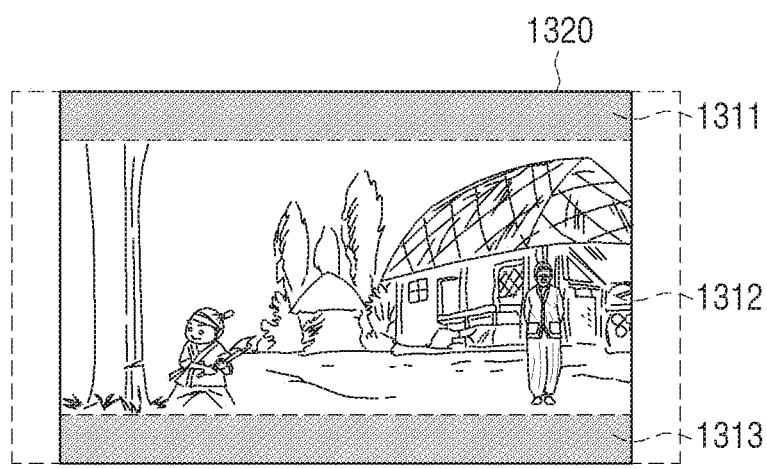
Figure 13B:
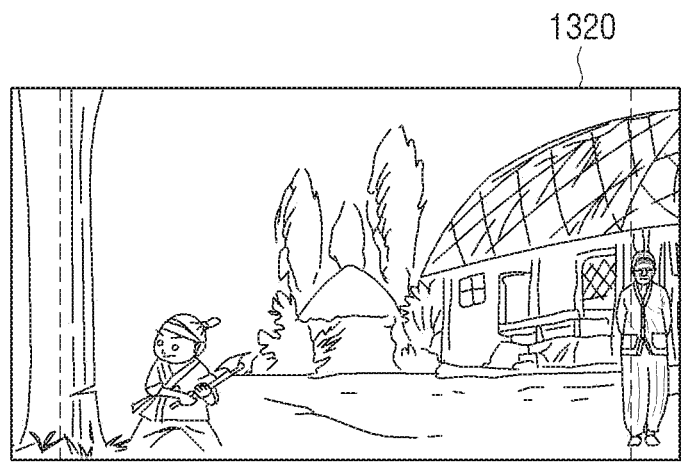

FIGS. 13A and 13B are user interface windows, according to various embodiments of the present disclosure.

In the case where it is necessary to make the extension as described above, a user interface window 1320 may reduce an image of the second content and display the reduced second content in a first screen of a current size (4:3). Since a screen ratio of the second content differs from that of the first content 1312, blank areas 1311, 1313 in which no image is displayed are disposed in upper and lower areas of the image.

Under the situation, a screen of the flexible display 110 is extended in the left and right directions, and a screen of the second content is extended at a same ratio to correspond to the speed of extension. A display area finally extended is to have a ratio that corresponds to the second content, and thus, the blank areas displayed in the transfer process are to disappear as illustrated in FIG. 13B.

Meanwhile, it was described that a new content is displayed in the transfer process; however, according to an embodiment, an image corresponding to a content selected by a user may not be displayed while a screen size is being changed. In this regard, it will be described below with reference to FIGS. 14A to 14C.

Figure 14A:
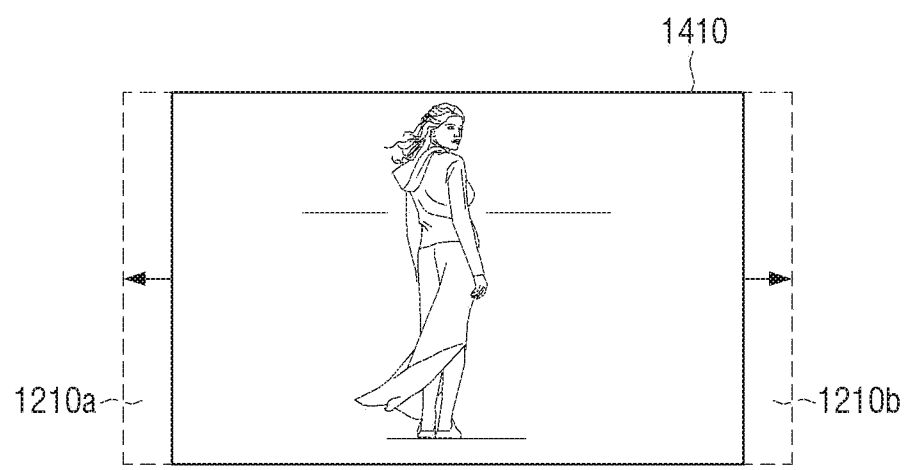
Figure 14B:
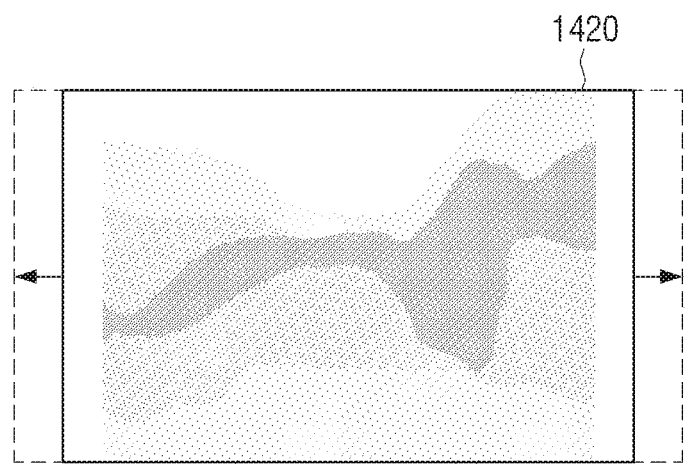
Figure 14C:
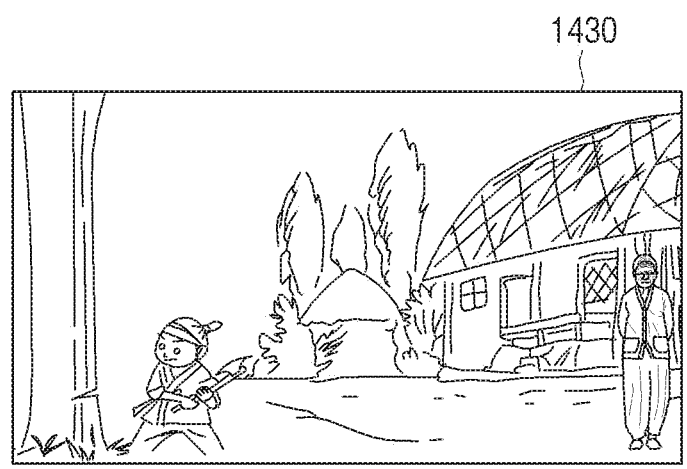

FIGS. 14A to 14C are user interface windows, according to various embodiments of the present disclosure.

Referring to FIG. 14A, a user interface window 1410 displays a first content of a first screen size (4:3). At this time, a user may input a command to reproduce a second content of a second screen size (169). Since a screen size of the first content is larger, the flexible display 110 is to be extended in the left and right directions.

During an extension as such, a user interface window 1420 displays a UI element corresponding to a graphic effect which is of no relevance to the first content and the second content.

Then, when a screen of the flexible display 110 is extended completely, a user interface 1430 may display a second content selected by a user as illustrated in FIG. 14C.

In addition, according to an embodiment, the aforementioned transfer process may as well be embodied as the combination of multiple transfer processes. For example, from the combination of the embodiment of FIGS. 12A to 12C with the embodiment of FIGS. 14A to 14C, a second content may be overlaid with a UI element corresponding to a graphic effect and displayed while a screen size of the display is being changed, as illustrated in FIG. 15A.

Figure 15A:
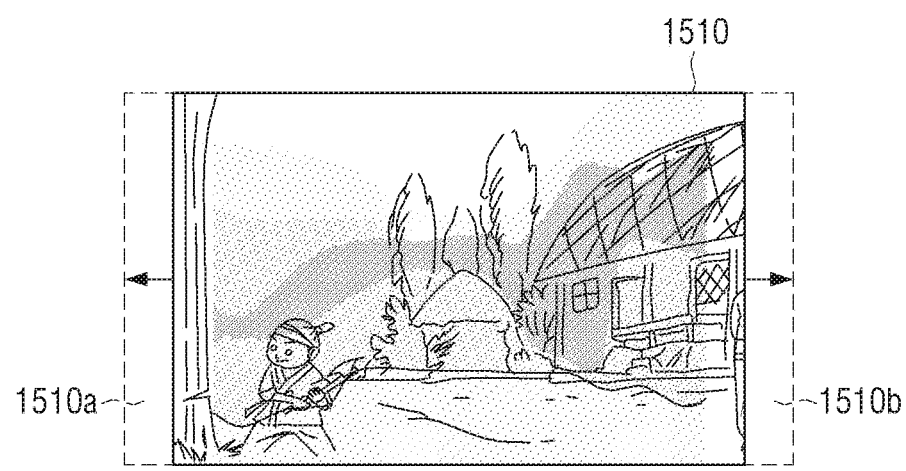
Figure 15B:
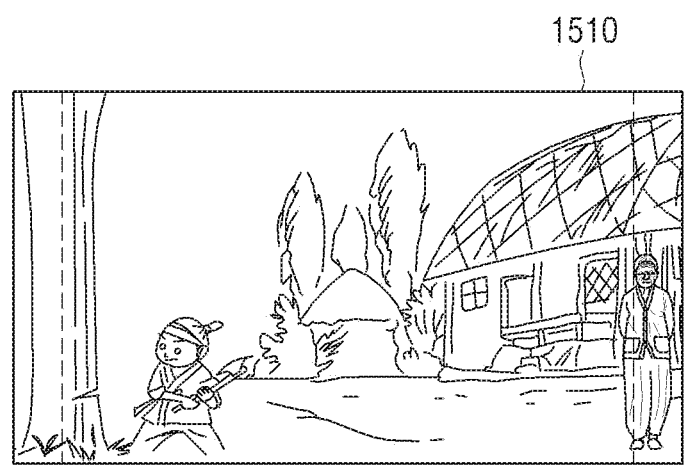

FIGS. 15A and 15B are user interface windows, according to various embodiments of the present disclosure.

Meanwhile, it was described above that an image is displayed while a screen size is being changed; however, according to an embodiment, it may be that no image is displayed at the time of when a screen size is changed. That is, while a screen size is being changed, an image displaying operation may be stopped, and when the changing of screen size is complete, a changed content may be displayed.

Meanwhile, it was described above that when a user selects a content, a screen size of the flexible display 1510 is changed by areas 1510a and 1510b to correspond to the content selected by the user. However, according to an embodiment, a screen size may be changed in response to not only a change of a content but also a user manipulation, a manipulation of another terminal apparatus, and the like.

Specifically, it is presumed that the display apparatus according to the present embodiment is a large-sized display apparatus, and thus, a user does not change a screen size of the corresponding display apparatus directly, but using an instrument. Accordingly, it will be described various interaction methods to remotely control a screen size of a flexible display apparatus below with reference to FIGS. 16A to 16C, 17A to 17D, 18, and 19.

Figure 16A:
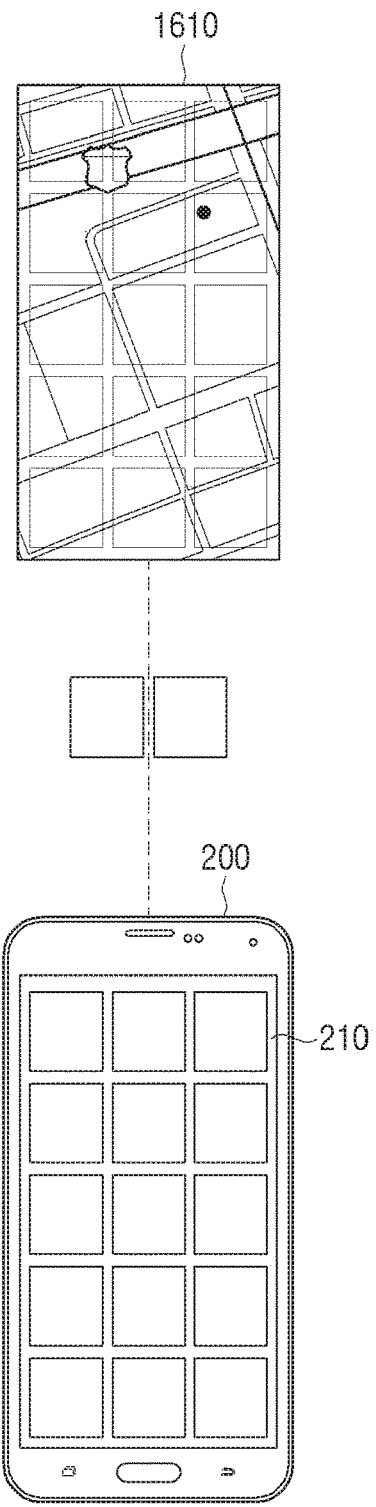
Figure 16B:
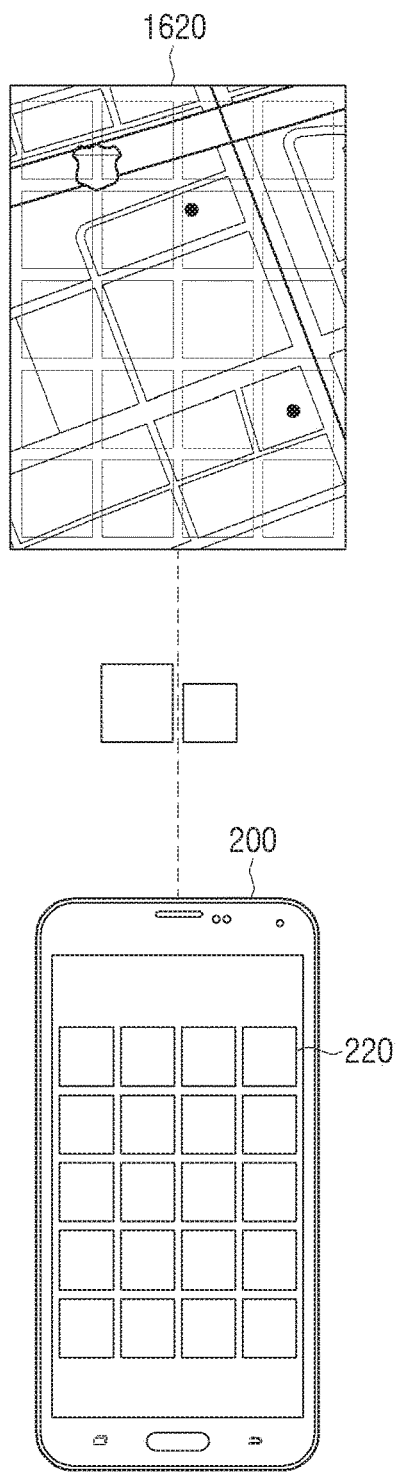
Figure 16C:
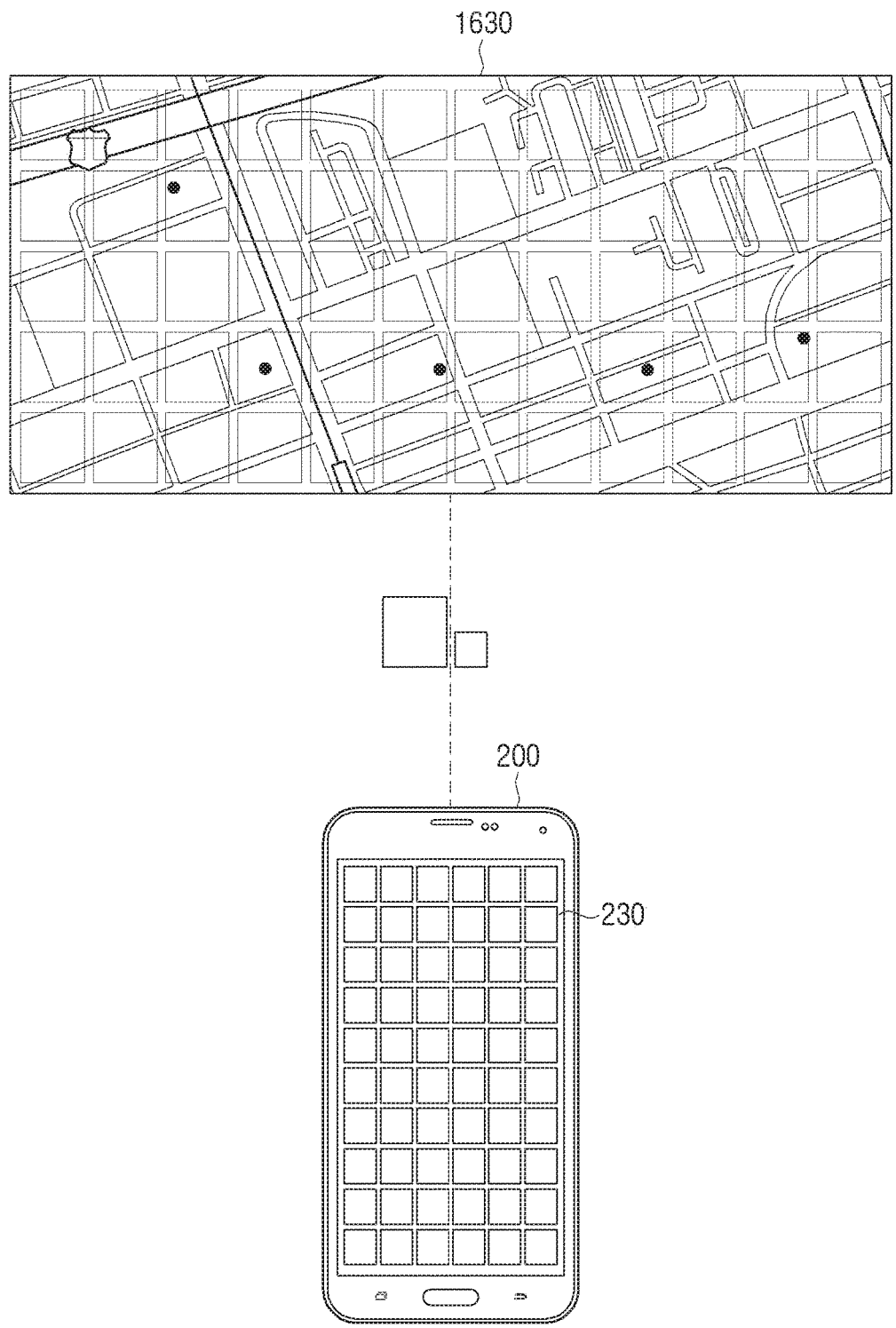

Specifically, FIGS. 16A to 16C are views provided to explain that a screen size of a flexible display apparatus is changed in response to a manipulation of an external mobile apparatus according to various embodiments of the present disclosure.

Referring to FIGS. 16A to 16C, a user watches a content 210 using a mobile apparatus 200. At this time, the user may want to watch the content 210 in the display apparatus 1610, and input a mirroring command. Accordingly, the display apparatus 1610 mirrors a content 210 transmitted from the mobile apparatus 200 and displays the content.

At this time, when the user changes a ratio of a content on the mobile apparatus 200, the mobile apparatus 200 is to display an image 220 according to the changed ratio as illustrated in FIGS. 16B and 16C.

That is, a blank area which does not display the corresponding image is generated in the mobile apparatus 200. However, the display apparatus 1620 recognizes that a ratio of image of a content is changed, and changes a screen size corresponding to the changed ratio. Accordingly, the display apparatus 1630 is to display an image 230 without additional screen distortion.

FIGS. 17A to 17D are user interface windows according to various embodiments of the present disclosure.

Figure 17A:
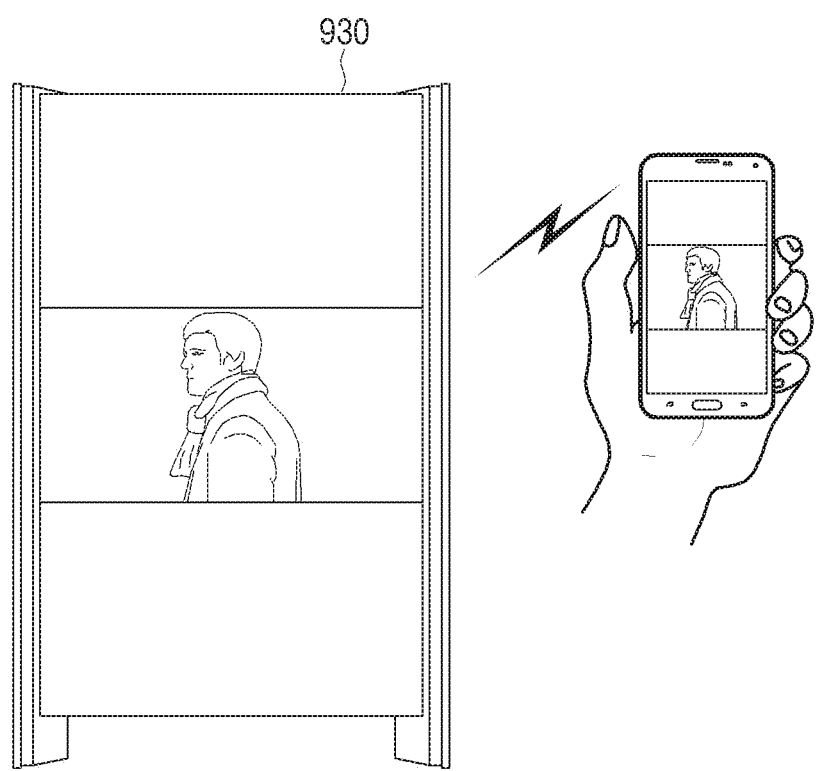
FIGS. 17A to 17D, 18, and 19 are views provided to explain various embodiments to control a display apparatus using an external apparatus according to various embodiments of the present disclosure.

Referring to FIG. 17A, a user watches a content 930 using the mobile apparatus 200. At this time, when the user mirrors the content A to the display apparatus 100, the display apparatus 100 may display an image corresponding to the transmitted content and a display method of the mobile apparatus 200.

Figure 17B:
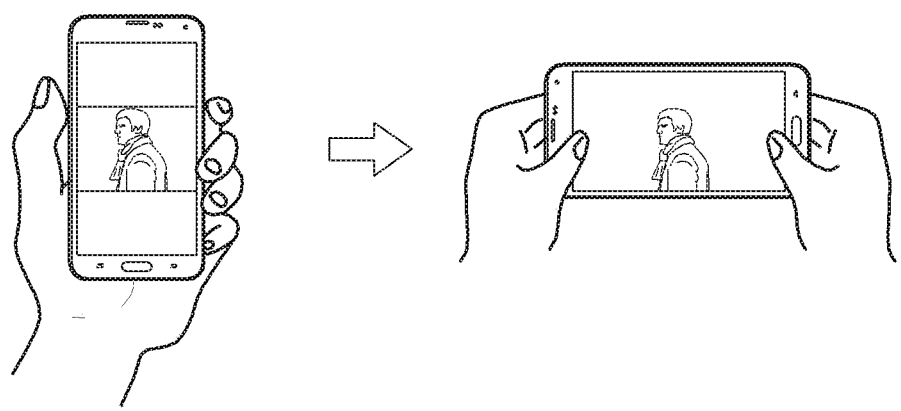
Figure 17C:
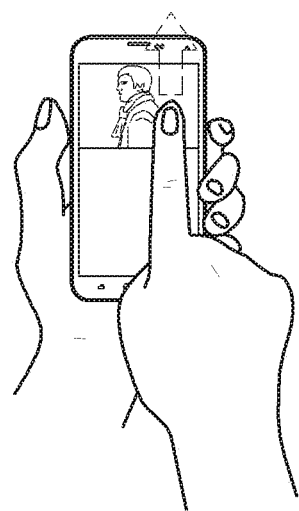
Figure 17D:

At this time, referring to FIG. 17B, when the user rotates the mobile apparatus 200, and a screen disposition of the mobile apparatus is changed accordingly, the display apparatus 100 may change a screen size to correspond to a ratio of rotation of the mobile apparatus, and display the corresponding content 930 of the changed screen size, as illustrated in FIG. 17D.

In addition, according to an embodiment, a screen ratio of the display apparatus 100 may be changed not only by a rotation operation of a mobile apparatus by the user but also by inputting a touch gesture as if the corresponding content were being transmitted externally, as illustrated in FIG. 17C.

Figure 18:
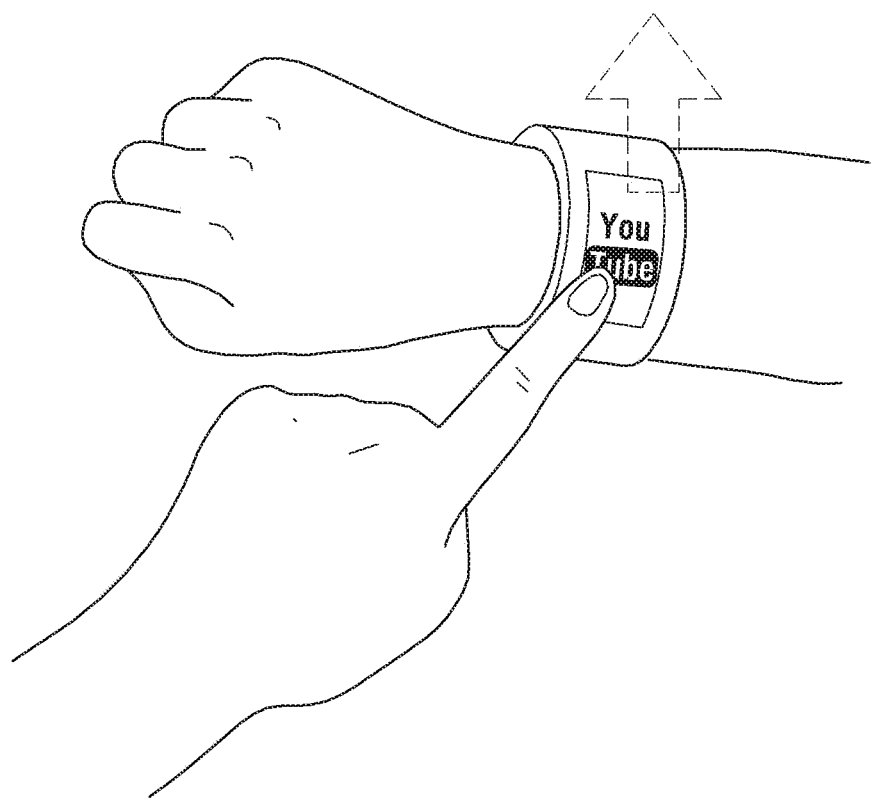

FIG. 18 is a user interface window according to an embodiment of the present disclosure.

Referring to FIG. 18, the user may reproduce a content stored in a wearable apparatus in a display apparatus. In this case, the user may input a particular touch gesture to the wearable apparatus, wherein a control command corresponding to the touch gesture is transmitted to the display apparatus 100, and the display apparatus 100 may change a screen size corresponding to the control command.

Figure 19:
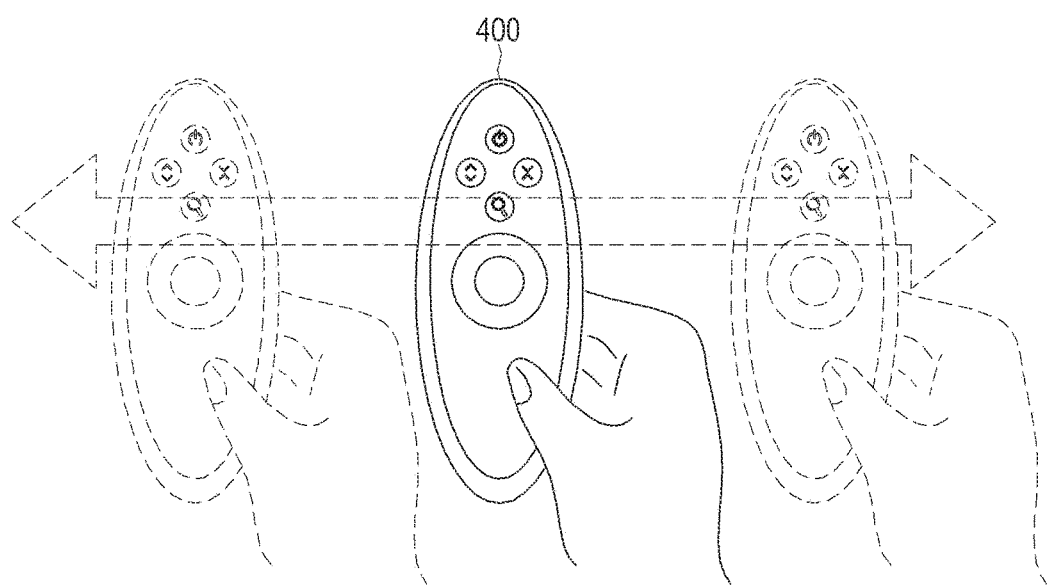

FIG. 19 is a gesture using a remote control according to an embodiment of the present disclosure.

Referring to FIG. 19, a user may manually change a screen size of a display apparatus through an operation of waving, from left to right, a remote control terminal apparatus 400 (that is, a remote controller) to operate a display apparatus. For example, a screen may be extended through an operation of waving a remote controller left and right. Also, a screen reduction command may be input through an operation of shaking the remote controller up and down.

It was only described that a remote control is performed using an apparatus other than a display apparatus; however, a user may as well control a screen size of a display apparatus through a voice, that is, a voice recognition technology, or through a pre-registered motion behavior.

Figure 20:
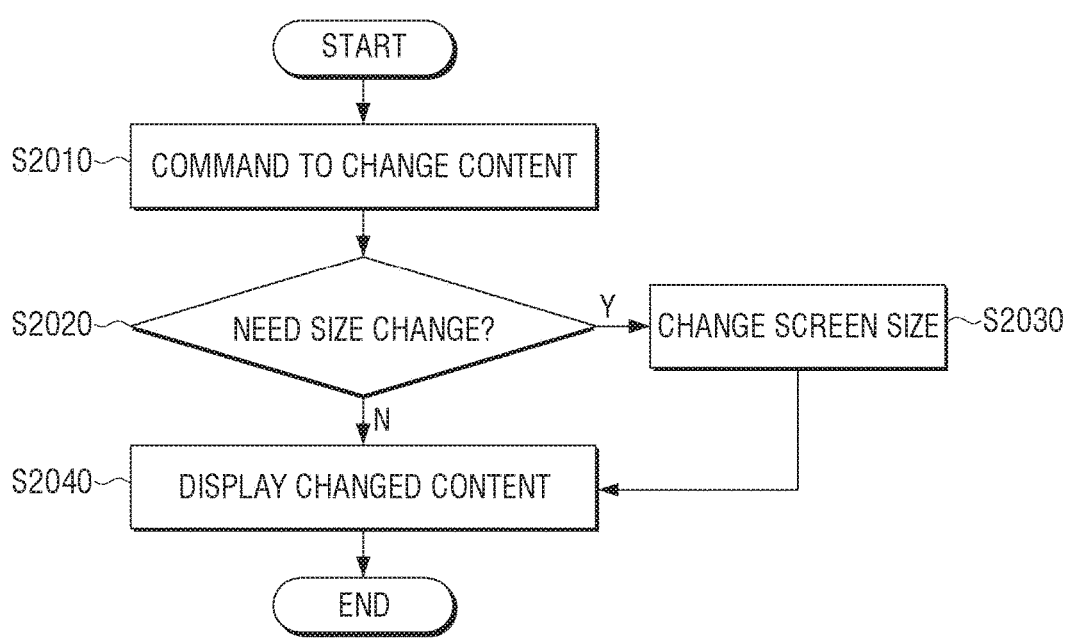
FIG. 20 is a flow chart provided to explain a method of controlling a display apparatus including a flexible display according to an embodiment of the present disclosure.

FIG. 20 is a flowchart provided to explain a method for controlling a display apparatus including a flexible display according to various embodiments of the present disclosure.

Referring to FIG. 20, a user may select at operation S2010 a content to be displayed in a flexible display. When such change command is input, a size of a screen to display the corresponding content may be determined, and a current size of a screen of the flexible display apparatus may be identified. Through this process, it may be determined whether it is necessary to change a current screen size of the flexible display apparatus.

As a result of determination, when change is necessary at operation S2020, a screen size of the flexible display is changed at operation S2030 to have a determined screen size.

Upon determination, when change is not necessary, or the change has been processed, at operation S2040 an image corresponding to changed content may be displayed using the flexible display.

By the aforementioned embodiment, a size of a flexible display may be automatically changed adaptively according to a size of a content, thereby preventing a distortion of image and an inefficient use of a display. In addition, a user may experience various user environments in response to a form of a display apparatus.

The aforementioned displaying method of the display apparatus may be embodied as a program executable by a program, and the program may be stored in a non-transitory computer readable medium.

A non-transitory computer readable medium refers to a computer readable medium that stores data semi-permanently and not for a short period of time such as a register, cache, memory, and the like. The aforementioned various applications or programs may be stored in a non-transitory computer readable medium such as a compact disc (CD), a digital versatile disc (DVD), a hard disk, a Blu-ray disc, a USB stick, a memory card, and a ROM.

Figure 21:
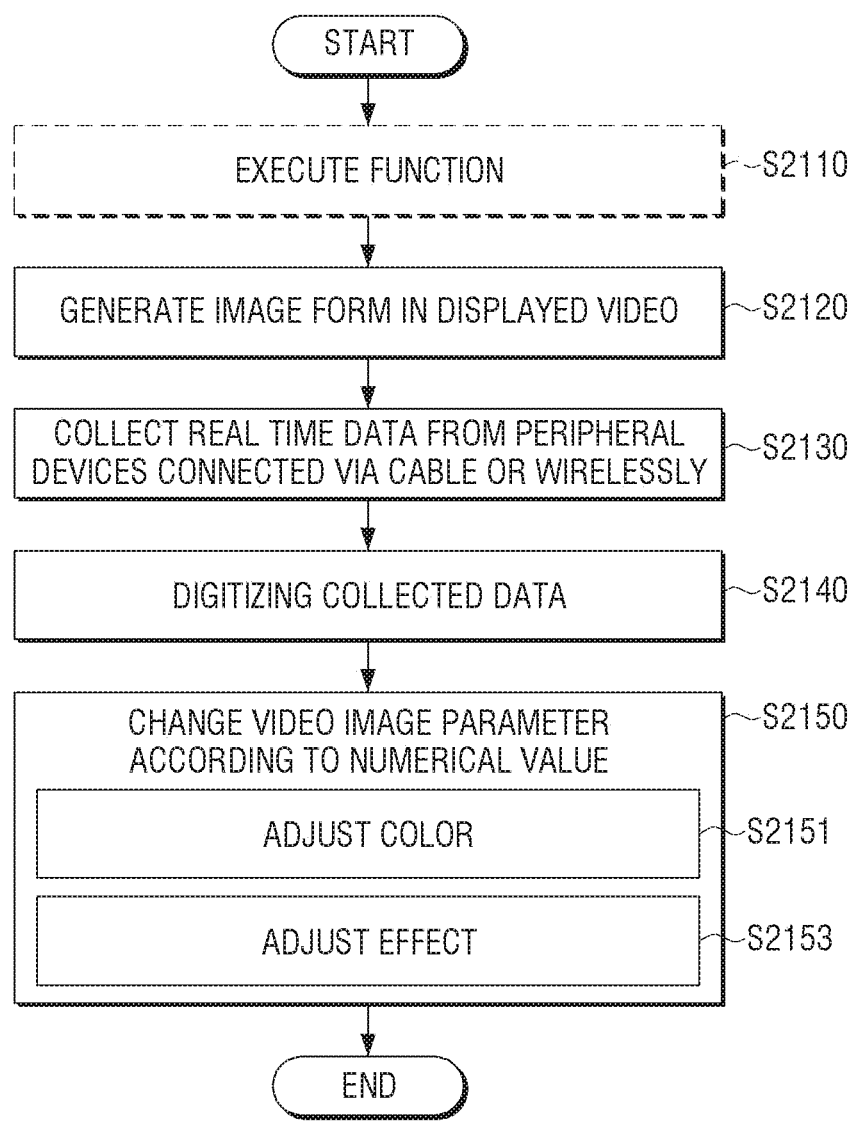
FIGS. 21 and 22 are flowcharts provided to explain specifically a determining operation of FIG. 20 according to various embodiments of the present disclosure.
Figure 22:
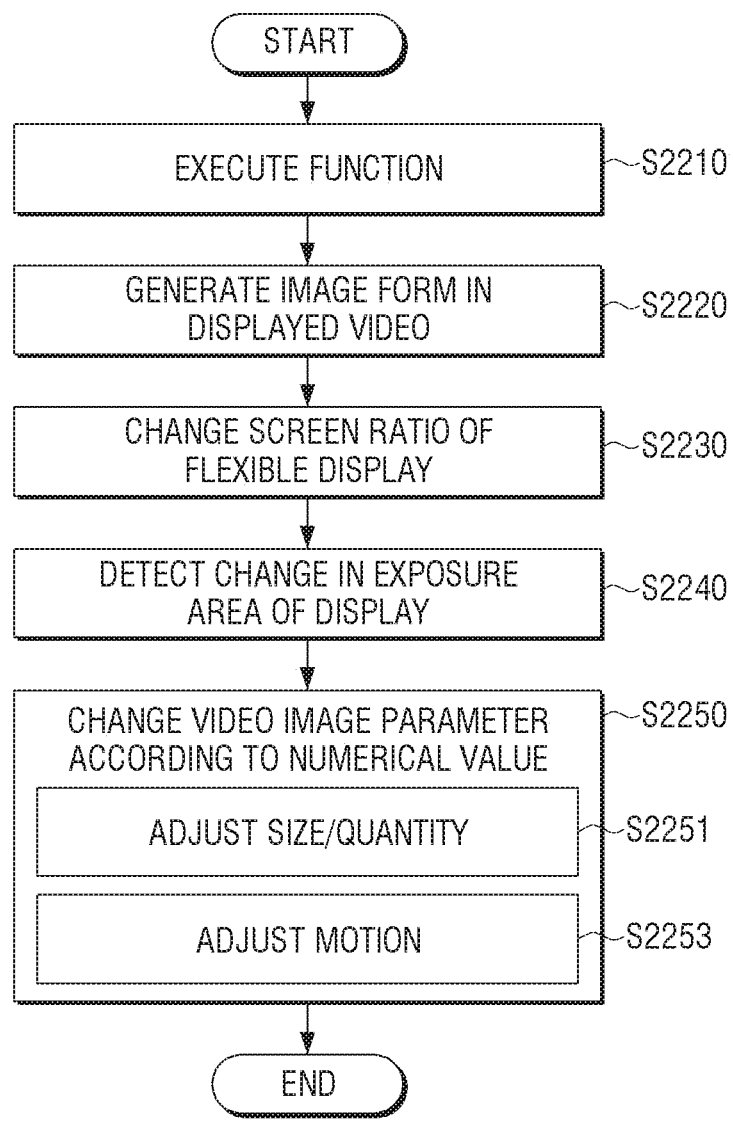

FIGS. 21 and 22 are flowcharts provided to explain specifically the determining operation of FIG. 20, according to various embodiments of the present disclosure.

Referring to FIG. 21, first, a particular function of a display apparatus may be executed at operation S2110.

When the corresponding function is performed, an image form corresponding to the function may be generated and displayed at operation S2120.

Then, data may be collected at operation S2130 in real time from a terminal apparatus (for example, home appliances within a home network) connectable with the display apparatus 100.

Then, main numerical figure may be extracted at operation S2140 from the collected data, and an image is converted in real time by applying a parameter corresponding to a predetermined reference value at operation S2150. For example, a color value corresponding to a predetermined value from among warm and mild red-like colors and cold and neutral blue-like colors may be substituted according to a characteristic of temperature and information at operation S2151. Alternatively, an effect corresponding to a predetermined reference value may be submitted according to high and low of a numerical value at operation S2153. Such effect may be applied as a graphic effect described with reference to FIGS. 14B and 15B.

Referring to FIG. 22, first, a particular function of a display apparatus is executed at operation S2210.

When the corresponding function is performed, an image form corresponding to the function may be generated and displayed at operation S2220 and S2230.

Then, a screen ratio (or screen size) change may be detected at operation 2240 using a sensor attached to a flexible display.

Then, an image may be converted at operation S2250 in real time by applying a parameter corresponding to a predetermined reference value based on the collected screen information. Specifically, when a screen is stopped or is being extended, a graphic motion may be adjusted accordingly at operation S2251. Alternatively, the number of objects and size of a graphic may be adjusted according to a size conversion or ratio change of a screen at operation S2253.

While the present disclosure has been shown and described with reference to various embodiments thereof, it will be understood by those skilled in the art that various changes in form and t details may be made therein without departing from the spirit and scope of the present disclosure as defined by the appended claims and their equivalents.

What is claimed is:

1. A display apparatus comprising:
   a flexible display;
   a roller configured to roll or unroll the flexible display;
   a motor configured to drive the roller; and
   a processor configured to:
      control the motor to drive the roller to roll or unroll the flexible display based on a size of a first content when a current screen size is different from a screen size of the first content,
      control the flexible display to display an image of the first content on an area which is not rolled of the flexible display,
      in response to a selection of a second content being received while the first content is displayed and the size of the first content and a size of the second content being different, control the motor to drive the roller to roll or unroll the flexible display based on the size of the second content, and
      control the flexible display to display an image of the second content on an area which is not rolled of the flexible display.

2. The apparatus as claimed in claim 1, wherein the processor is further configured to:
   determine a screen ratio of the first content, and
   control the motor such that the flexible display has a screen size corresponding to the determined screen ratio.

3. The apparatus as claimed in claim 1,
   wherein the flexible display has a display area which is flat and is rollable towards one side, and
   wherein the motor is configured to vary a screen size of the flexible display by rolling or unrolling a partial area of the display area.

4. The apparatus as claimed in claim 3, wherein the motor is further configured to vary a width of the flexible display by rolling or unrolling the display area in a transverse direction of the display apparatus.

5. The apparatus as claimed in claim 1, wherein the processor is further configured to, in response to a particular event occurring, control the motor and the flexible display to display a user interface (UI) element corresponding to the particular event, at a screen size corresponding to the UI element.

6. The apparatus as claimed in claim 5,
wherein the particular event is a command to drive a smart television (TV) function, and
wherein the processor is further configured to:
control a channel list to be displayed at a preset first screen size, and
in response to any one channel from among the displayed channel list being selected, control a content corresponding to the selected channel to be displayed at a second screen size which is larger than the first screen size.

7. The apparatus as claimed in claim 5,
wherein the particular event is a reception of a notification message regarding an event or state change that occurred in a device connected to the display apparatus within a home network, and
wherein the processor is further configured to:
control the notification message to be displayed at a predetermined first screen size, and
in response to the notification message being selected, control device information corresponding to the notification message to be displayed at a second screen size which is larger than the first screen size.

8. The apparatus as claimed in claim 1, wherein the processor is further configured to, while rolling or unrolling the flexible display, change a size of an image corresponding to the first content and control the flexible display to display the image.

9. The apparatus as claimed in claim 1, wherein the processor is further configured to, while rolling or unrolling the flexible display, fix a size of an image corresponding to the first content and control the flexible display to display the image.

10. The apparatus as claimed in claim 1, wherein the processor is further configured to, while rolling or unrolling the flexible display, control an image corresponding to the first content not to be displayed.

11. The apparatus as claimed in claim 1, wherein the processor is further configured to, while rolling or unrolling the flexible display, control the flexible display to display a UI element unrelated to the first content.

12. The apparatus as claimed in claim 1, further comprising:
a transceiver configured to receive screen size information from an external apparatus,
wherein the processor is further configured to control the motor to roll or unroll the flexible display based on the received screen size information and control the flexible display to display the image at a screen size corresponding to the received screen size information.

13. A displaying method of a display apparatus including a flexible display, the displaying method comprising:
rolling or unrolling, by a roller, the flexible display;
driving, by a motor, the roller;
controlling, by a processor, the motor to drive the roller to roll or unroll the flexible display based on a size of a first content when a current screen size is different from a screen size of the first content;
controlling, by the processor, the flexible display to display an image of the first content on an area which is not rolled of the flexible display;
in response to a selection of a second content being received while the first content is displayed and the size of the first content and a size of the second content being different, controlling, by the processor, the motor to drive the roller to roll or unroll the flexible display based on the size of the second content, and
controlling, by the processor, the flexible display to display an image of the second content on an area which is not rolled of the flexible display.

14. The method as claimed in claim 13, wherein the rolling or unrolling comprises determining a screen ratio of the first content, and determining a screen size corresponding to the determined screen ratio.

15. The method as claimed in claim 13, wherein the rolling or unrolling comprises rolling or unrolling a display area, which is flat in a transverse direction, of the display apparatus and changing a width of the flexible display.

16. The method as claimed in claim 13,
wherein the rolling or unrolling comprises, in response to a particular event occurring, determining a screen size corresponding to a screen ratio of a user interface (UI) element corresponding to the particular event, and
wherein the displaying comprises displaying the UI element.

17. The method as claimed in claim 13, wherein the displaying comprises, while rolling or unrolling the flexible display, changing a size of an image corresponding to the first content and displaying the image.

18. The method as claimed in claim 13, wherein the displaying comprises, while rolling or unrolling the flexible display, fixing a size of an image corresponding to the first content and displaying the image.

19. The method as claimed in claim 13, further comprising:
detecting a user gesture; and
rolling or unrolling the flexible display based on the detected user gesture.

20. The method as claimed in claim 13, further comprising:
detecting movement of a remote controller; and
rolling or unrolling the flexible display based on the detected movement.

* * * * *